United States Patent [19]

Belknap et al.

[11] Patent Number: 5,586,264

[45] Date of Patent: Dec. 17, 1996

[54] VIDEO OPTIMIZED MEDIA STREAMER WITH CACHE MANAGEMENT

[75] Inventors: William R. Belknap, San Jose; Martha R. Henley, Morgan Hill; Lorenzo Falcon, Jr., San Jose; Thomas E. Frayne, San Jose; Mei-Lan Luo, San Jose; Ashok R. Saxena, San Jose, all of Calif.

[73] Assignee: IBM Corporation, San Jose, Calif.

[21] Appl. No.: 302,619

[22] Filed: Sep. 8, 1994

[51] Int. Cl.[6] ............................. H04N 7/14; G06F 15/00
[52] U.S. Cl. .................. 395/200.08; 395/800; 395/872; 395/834; 348/7; 364/DIG. 1; 364/DIG. 2; 364/239; 364/238.3; 364/241.9; 364/222.2; 364/939; 364/260; 364/242.94
[58] Field of Search ..................... 348/7; 370/60, 370/94.1; 364/DIG. 1, DIG. 2, 239, 234, 236.3, 236.2, 248.1, 260, 238.4, 254, 259, 241.9, 271, 939; 395/600, 164, 439, 427, 441, 275, 100, 118, 154

[56] References Cited

U.S. PATENT DOCUMENTS

| | | | |
|---|---|---|---|
| 4,616,263 | 10/1986 | Eichelberger | 358/12 |
| 4,679,191 | 7/1987 | Nelson et al. | 370/84 |
| 4,949,187 | 8/1990 | Cohen | 358/335 |
| 5,089,885 | 2/1992 | Clark | 358/86 |
| 5,133,079 | 7/1992 | Ballantyne et al. | 455/4.1 |
| 5,166,930 | 11/1992 | Braff et al. | 370/94.1 |
| 5,200,989 | 4/1993 | Milone | 379/53 |
| 5,283,639 | 2/1994 | Esch et al. | 348/6 |
| 5,289,461 | 2/1994 | de Nijs | 370/58.1 |
| 5,406,556 | 4/1995 | Widjaja et al. | 370/60 |
| 5,414,455 | 5/1995 | Hooper et al. | 348/7 |
| 5,442,390 | 8/1995 | Hooper et al. | 348/7 |

FOREIGN PATENT DOCUMENTS

| | | |
|---|---|---|
| 2117422 | 8/1993 | Canada . |
| 2071416 | 12/1993 | Canada . |
| 0368683 | 5/1990 | European Pat. Off. . |
| 0529864A1 | 3/1993 | European Pat. Off. . |
| 2270791 | 8/1993 | United Kingdom . |
| WO93/16557 | 8/1993 | WIPO . |
| WO94/12937 | 6/1994 | WIPO . |

OTHER PUBLICATIONS

European Search Report, Application No. EP 95 30 5966, dated 29 Dec. 1995.
Article entitled Interactive Video On Demand by Daniel Deloddere et al. as appeared in IEEE Communications Magazine, May 1994, pp. 82–88.

(List continued on next page.)

Primary Examiner—Thomas C. Lee
Assistant Examiner—Terance J. Stanton
Attorney, Agent, or Firm—Ohlandt, Greeley, Ruggiero & Perle

[57] ABSTRACT

A data storage system includes a mass storage unit storing a data entity, such as a digital representation of a video presentation, that is partitioned into a plurality N of temporally-ordered segments. A data buffer is bidirectionally coupled to the mass storage unit for storing up to M of the temporally-ordered segments, wherein M is less than N. The data buffer has an output for outputting stored ones of the temporally-ordered segments. The data storage system further includes a data buffer manager for scheduling transfers of individual ones of the temporally-ordered segments between the mass storage unit and the data buffer. The data buffer manager schedules the transfers in accordance with at least a predicted time that an individual one of the temporally-ordered segments will be required to be output from the data buffer. When employed with a media streamer (10) distributed data buffer management techniques are employed for selecting blocks to be retained in a buffer memory, either in a storage node (16, 17) or in a communication node (14). These techniques rely on the predictable nature of the video data stream, and thus are enabled to predict the future requirements for a given one of the data blocks.

12 Claims, 14 Drawing Sheets

OTHER PUBLICATIONS

"Intel Scalable Multi-server Technology for Interactive Multimedia Applications" May, 1994, 1994 Intel Corporation, pp. 3–15.

"Architectures for Video Servers" by Manu Thapar and Bill Koerner, Hewlett Packard, 1994 NCTA Technical Papers, pp. 141–148.

Allicat (0664) S10 SCSI Direct Access Storage Device Functional Specification Release 4.50, Document No. AS01–0003–00, formatted on May 6, 1993 IBM Corporation, pp. 1–291.

LOW LATENCY X-BAR CIRCUIT SWITCH

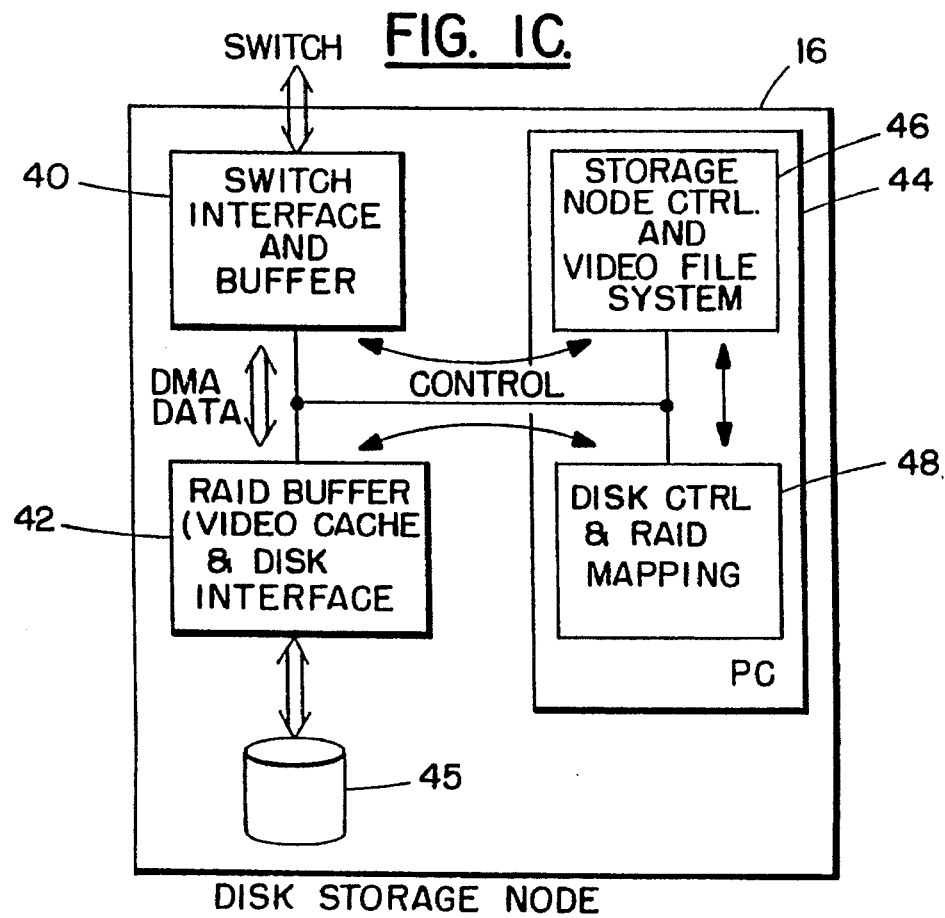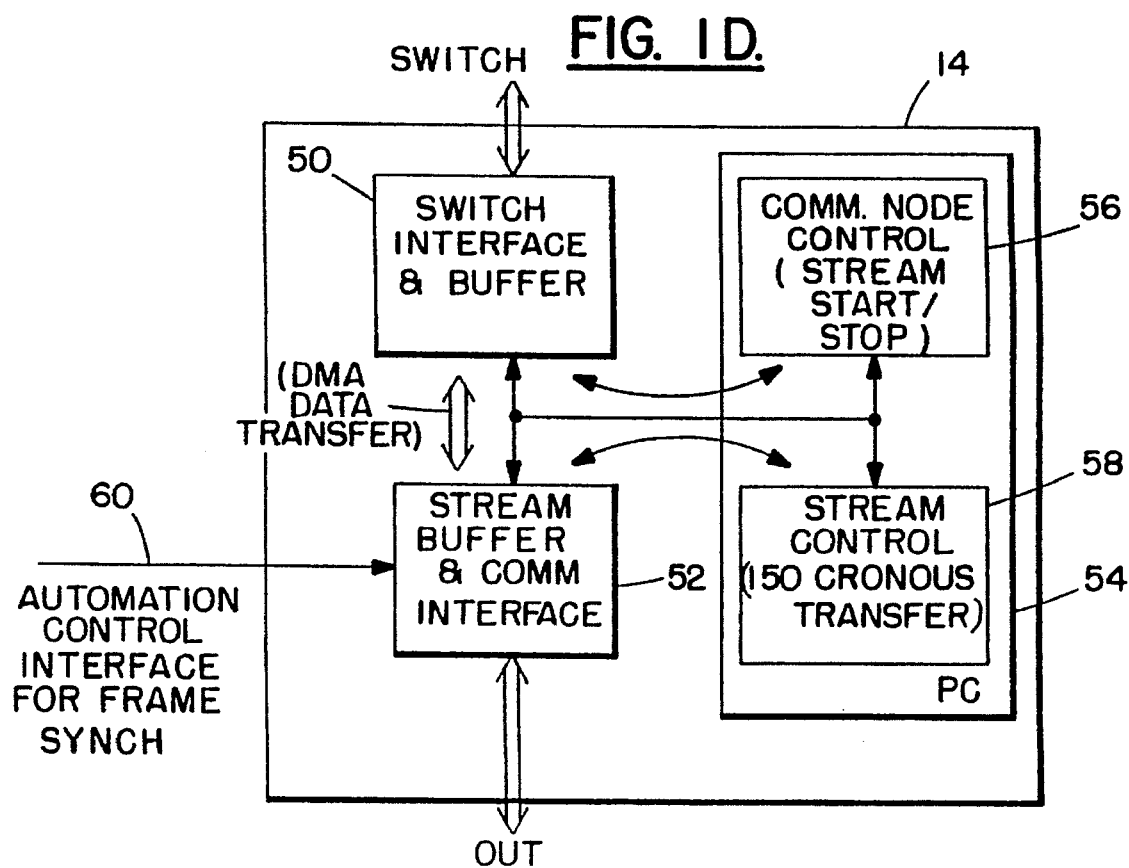

FIG. 2.

STREAM CONTROL COMMANDS (HIGH PRIORITY EXECUTION)
      VS-CONNECT
      VS-PLAY
      VS-RECORD
      VS-SEEK
      VS-PAUSE
      VS-STOP
      VS-DISCONNECT
      VS-CONNECT_LIST
      VS-PLAY_AT_SIGNAL
      VS-RECORD_AT_SIGNAL

DATA MANAGEMENT COMMANDS (LOW PRIORITY EXECUTION)
      VS-CREATE
      VS-OPEN
      VS-READ
      VS-WRITE
      VS-GET_POSITION
      VS-SET_POSITION
      VS-CLOSE
      VS-RENAME
      VS-DELETE
      VS-GET_ATTRIBUTES
      VS-GET_NAMES
      VS-DUMP
      VS-RESTORE
      VS-SEND
      VS-RECEIVE
      VS-RECEIVE_AND_PLAY

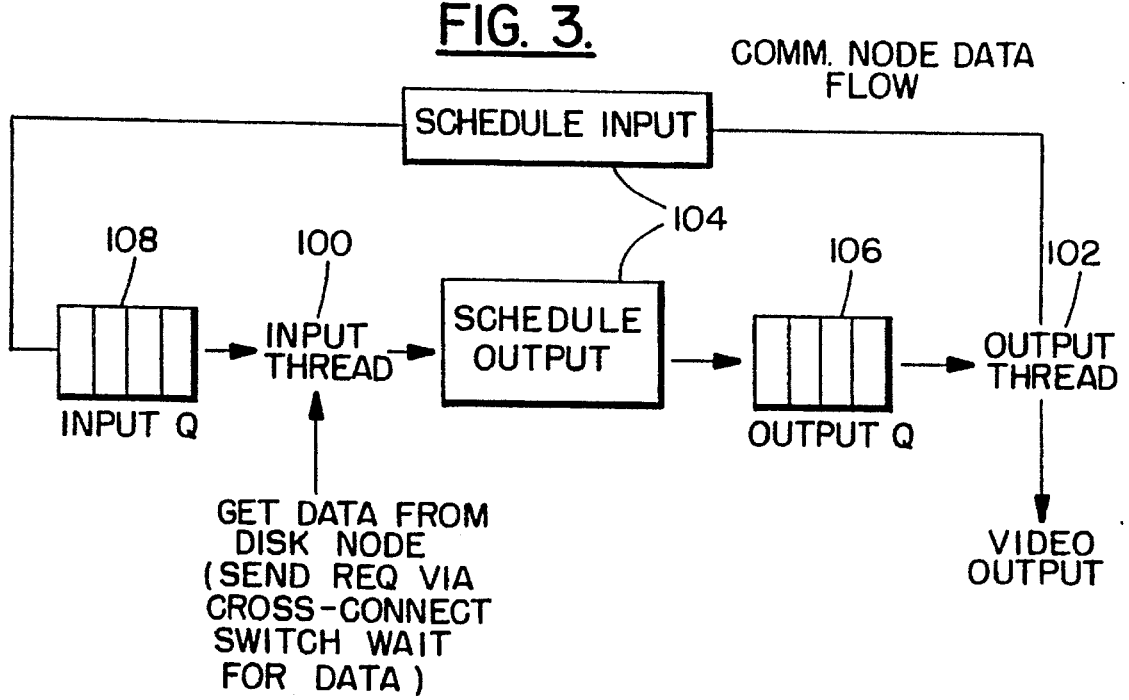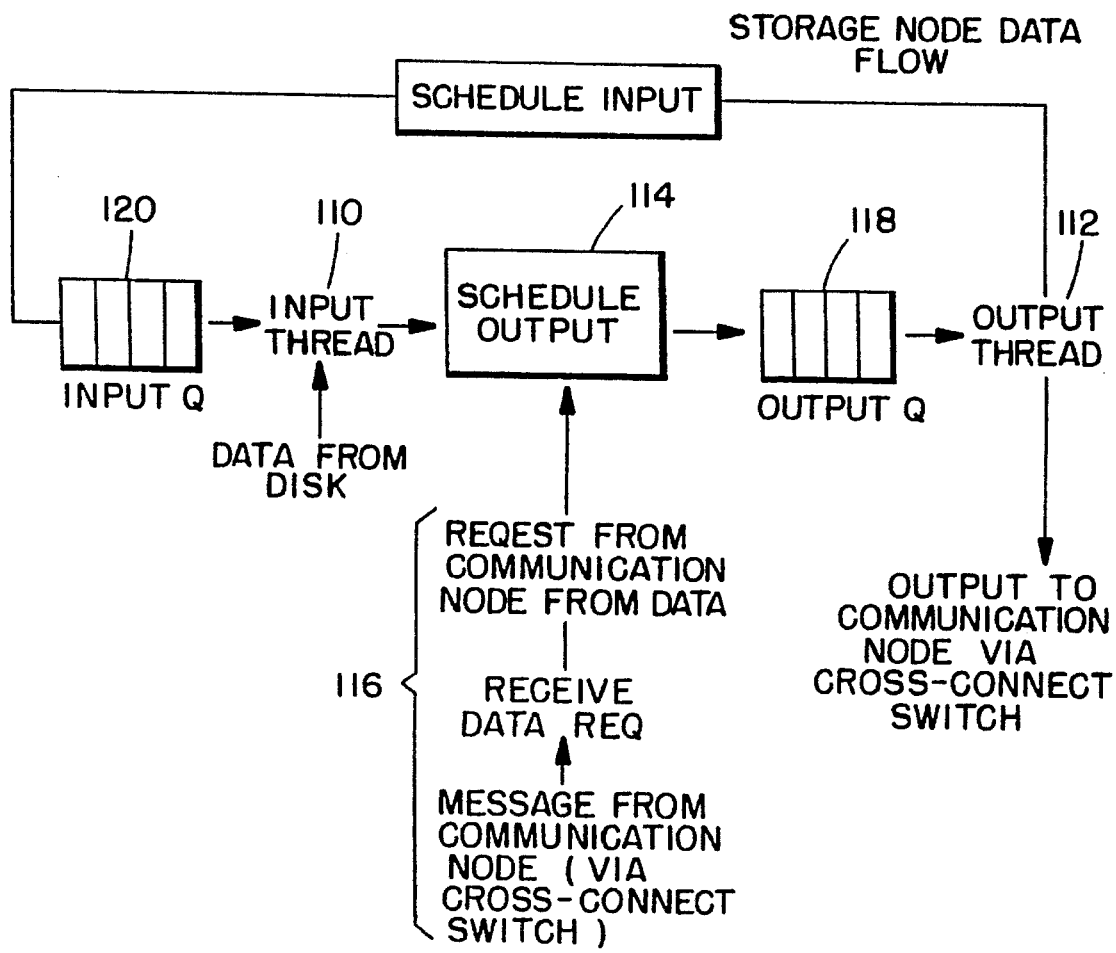

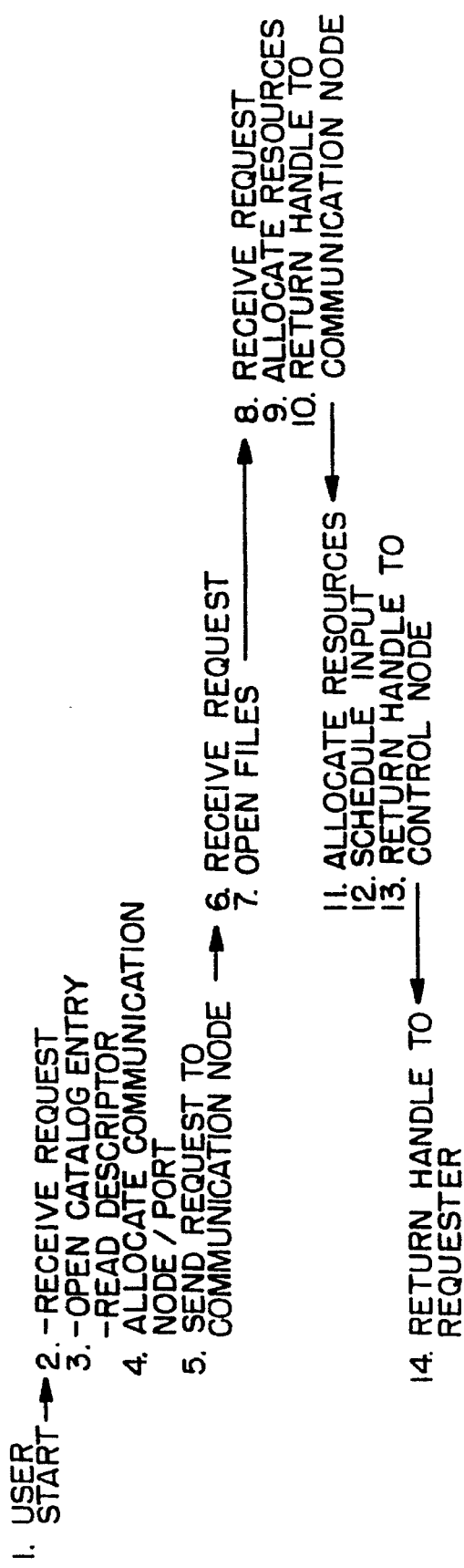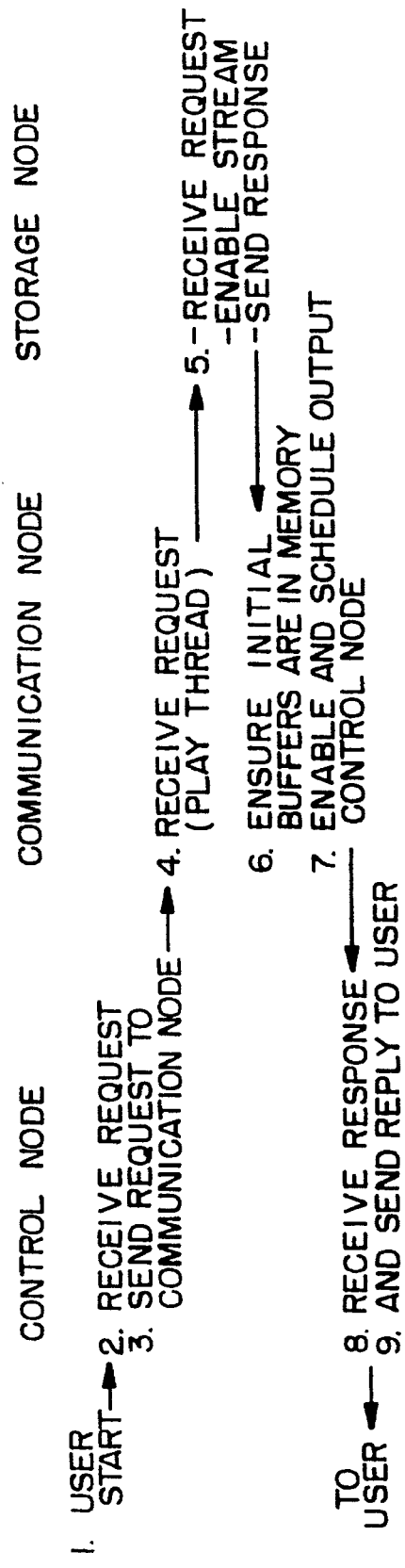

SEMENTED LOGICAL FILE FOR VIDEO 1

VIDEO 1

SWITCH INTERFACE

SWITCH INTERFACE WITH DYNAMIC BANDWITH ALLOCATION

VIDEO OPTIMIZED MEDIA STREAMER WITH CACHE MANAGEMENT

CROSS REFERENCE TO RELATED PATENT APPLICATIONS

This application is related to the following U.S. patent applications:

Ser. No. 08/302,625, filed Sep. 8, 1994, entitled "Video Optimized Media Streamer", Inventors: W. R. Belknap et al. now pending;

Ser. No. 08/302,616, filed Sep. 8, 1994, entitled "Video Optimized Media Streamer for Generating Isochronous Data Streams", Inventors: W. R. Belknap et al. now pending;

Ser. No. 08/302,626, filed Sep. 8, 1994, entitled "Video Optimized Media Streamer Data Flow Architecture", Inventors: M. Henley et al. now pending;

Ser. No. 08/303,190, filed Sep. 8, 1994, entitled "Video Optimized Media Streamer User Interface", Inventors: A. Saxena et al. now pending; and Ser. No. 08/302,624, filed Sep. 8, 1994, entitled "Video Optimized Media Streamer with Distributed Video Data Storage", Inventors: Falcon et al. now pending.

FIELD OF THE INVENTION

This invention relates to a system for delivery of multimedia data and, more particularly, an interactive video server system that provides video simultaneously to a plurality of terminals with minimal buffering.

BACKGROUND OF THE INVENTION

The playing of movies and video is today accomplished with rather old technology. The primary storage media is analog tape, such as VHS recorders/players, and extends up to the very high quality and very expensive D1 VTR's used by television studios and broadcasters. There are many problems with this technology. A few such problems include: the manual labor required to load the tapes, the wear and tear on the mechanical units, tape head, and the tape itself, and also the expense. One significant limitation that troubles Broadcast Stations is that the VTRs can only perform one function at a time, sequentially. Each tape unit costs from $75,000 to $150,000.

TV stations want to increase their revenues from commercials, which are nothing more than short movies, by inserting special commercials into their standard programs and thereby targeting each city as a separate market. This is a difficult task with tape technology, even with the very expensive Digital D1 tape systems or tape robots.

Traditional methods of delivery of multimedia data to end users fall into two categories: 1) broadcast industry methods and 2) computer industry methods. Broadcast methods (including motion picture, cable, television network, and record industries) generally provide storage in the form of analog or digitally recorded tape. The playing of tapes causes isochronous data streams to be generated which are then moved through broadcast industry equipment to the end user. Computer methods generally provide storage in the form of disks, or disks augmented with tape, and record data in compressed digital formats such as DVI, JPEG and MPEG. On request, computers deliver non-isochronous data streams to the end user, where hardware buffers and special application code smooths the data streams to enable continuous viewing or listening.

Video tape subsystems have traditionally exhibited a cost advantage over computer disk subsystems due to the cost of the storage media. However, video tape subsystems have the disadvantages of tape management, access latency, and relatively low reliability. These disadvantages are increasingly significant as computer storage costs have dropped, in combination with the advent of the real-time digital compression/decompression techniques.

Though computer subsystems have exhibited compounding cost/performance improvements, they are not generally considered to be "video friendly". Computers interface primarily to workstations and other computer terminals with interfaces and protocols that are termed "non-isochronous". To assure smooth (isochronous) delivery of multimedia data to the end user, computer systems require special application code and large buffers to overcome inherent weaknesses in their traditional communication methods. Also, computers are not video friendly in that they lack compatible interfaces to equipment in the multimedia industry which handle isochronous data streams and switch among them with a high degree of accuracy.

With the introduction of the use of computers to compress and store video material in digital format, a revolution has begun in several major industries such as television broadcasting, movie studio production, "Video on Demand" over telephone lines, pay-per-view movies in hotels, etc. Compression technology has progressed to the point where acceptable results can be achieved with compression ratios of 100× to 180×. Such compression ratios make random access disk technology an attractive alternative to prior art tape systems.

With an ability to random access digital disk data and the very high bandwidth of disk systems, the required system function and performance is within the performance, hardware cost, and expendability of disk technology. In the past, the use of disk files to store video or movies was never really a consideration because of the cost of storage. That cost has seen significant reductions in the recent past.

For the many new emerging markets that utilize compressed video data, using MPEG standards, there are several ways in which video data can be stored in a cost effective manner. This invention provides a hierarchical solution to many different performance requirements and results in a modular systems approach that can be customized to meet market requirements.

SUMMARY OF THE INVENTION

The invention provides a "video friendly" computer subsystem which enables isochronous data stream delivery in a multimedia environment over traditional interfaces for that industry. A media streamer in accordance with the invention is optimized for the delivery of isochronous data streams and can stream data into new computer networks with ATM (Asynchronous Transfer Mode) technology. This invention eliminates the disadvantages of video tape while providing a VTR (video tape recorder) metaphor for system control. The system of this invention provides the following features: scaleability to deliver from 1 to 1000's of independently controlled data streams to end users; an ability to deliver many isochronous data streams from a single copy of data; mixed output interfaces; mixed data rates; a simple "open system" control interface; automation control support; storage hierarchy support; and low cost per delivered stream.

In accordance with an aspect of this invention a data storage system includes a mass storage unit storing a data entity, such as a digital representation of a video presentation, that is partitioned into a plurality N of temporally-ordered segments. A data buffer is bidirectionally coupled to the mass storage unit for storing up to M of the temporally-ordered segments, wherein M is less than N. The data buffer has an output for outputting stored ones of the temporally-ordered segments. The data storage system further includes a data buffer manager for scheduling transfers of individual ones of the temporally-ordered segments between the mass storage unit and the data buffer. The data buffer manager schedules the transfers in accordance with at least a predicted time that an individual one of the temporally-ordered segments will be required to be output from the data buffer.

Further in accordance with this invention there is provided a media streamer having at least one storage node for storing a digital representation of at least one video presentation. The at least one video presentation requires a time T to present in its entirety, and is stored as a plurality of N data blocks. Each data block is a T/N portion of the at least one video presentation. The at least one storage node includes a first data buffer for buffering at least one of the N data blocks. The media streamer further includes a plurality of communication nodes each having an input port that is coupled via a circuit switch to an output of the first data buffer for sequentially receiving a plurality of the N data blocks therefrom. The sequentially received N data blocks are associated with a same video presentation or with different video presentations. Each of the plurality of communication nodes further have a plurality of output ports, wherein individual ones of the plurality of output ports output a digital representation of one video presentation. Individual ones of the plurality of communication nodes further include a second data buffer for buffering at least one of the N data blocks prior to outputting the at least one of the N data blocks. The media streamer further includes at least one control node responsive to a first operating condition for causing transfer of one of the N data blocks from the first data buffer to an output port of a first communication node and also to an output port of a second communication node, the at least one control node being further responsive to a second operating condition for causing transfer of one of the N data blocks from the first data buffer to the second data buffer of one of the communication nodes, and for causing transfer of the one of the N data blocks from the second data buffer to a plurality of the output ports of the one of the communication nodes.

Embodiments are disclosed of presently preferred distributed data buffer management techniques for selecting blocks to be retained in a buffer memory, either in a storage node or in a communication node. These techniques rely on the predictable nature of the video data stream, and thus are enabled to predict the future requirements for a given one of the data blocks.

BRIEF DESCRIPTION OF THE DRAWINGS

FIG. 1C is a block diagram which illustrates further details of a disk storage node shown in FIG. 1;

FIG. 1D is a block diagram which illustrates further details of a communication node shown in FIG. 1;

FIG. 2 illustrates a list of video stream output control commands which are executed at high priority and a further list of data management commands which are executed at lower priority;

FIG. 3 is a block diagram illustrating communication node data flow;

FIG. 4 is a block diagram illustrating disk storage node data flow;

FIG. 5 illustrates control message flow to enable a connect to be accomplished;

FIG. 6 illustrates control message flow to enable a play to occur;

DETAILED DESCRIPTION OF THE INVENTION

GLOSSARY

Figure 1:
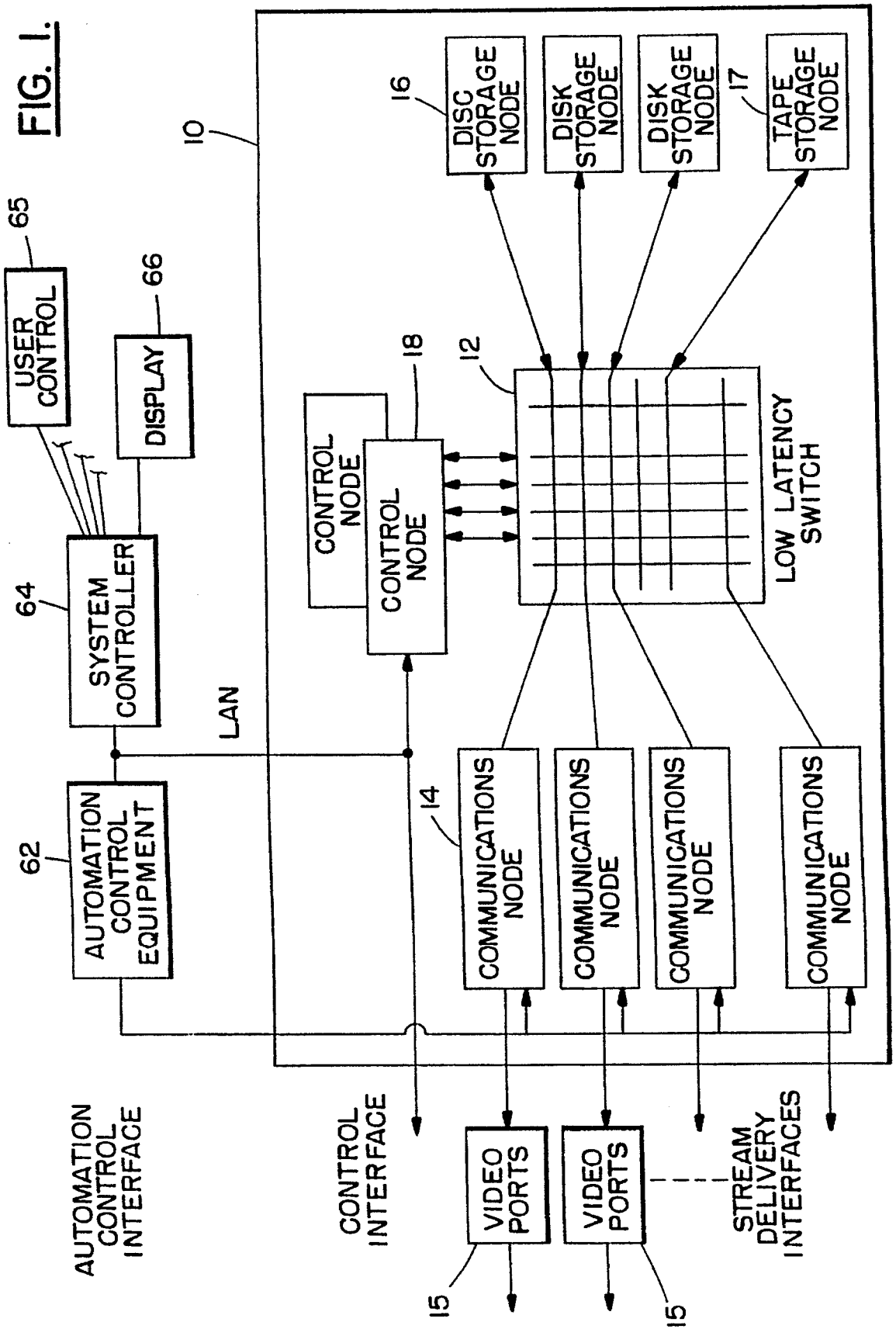
FIG. 1 is a block diagram of a media streamer incorporating the invention hereof.

In the following description, a number of terms are used that are described below:

AAL-5 ATM ADAPTATION LAYER-5: Refers to a class of ATM service suitable for data transmission.

ATM ASYNCRHONOUS TRANSFER MODE: A high speed switching and transport technology that can be used in a local or wide area network, or both. It is designed to carry both data and video/audio.

Betacam A professional quality analog video format.

CCIR 601 A standard resolution for digital television. 720×840 (for NTSC) or 720×576 (for PAL) luminance, with chrominance subsampled 2:1 horizontally.

CPU CENTRAL PROCESSING UNIT: In computer architecture, the main entity that processes computer instructions.

CRC CYCLIC REDUNDANCY CHECK. A data error detection scheme.

D1 Digital Video recording format conforming to CCIR 601. Records on 19 mm video tape.

D2 Digital video recording format conforming to SMPTE 244M. Records on 19 mm video tape.

D3 Digital Video recording format conforming to SMPTE 244M. Records on ½" video tape.

DASD DIRECT ACCESS STORAGE DEVICE: Any on-line data storage device or CD-ROM player that can be addressed is a DASD. Used synonymously with magnetic disk drive.

DMA DIRECT MEMORY ACCESS: A method of moving data in a computer architecture that does not require the CPU to move the data.

DVI A relatively low quality digital video compression format usually used to play video from CD-ROM disks to computer screens.

E1 European equivalent of T1.

FIFO FIRST IN FIRST OUT: Queue handling method that operates on a first-come, first-served basis.

GenLock Refers to a process of synchronization to another video signal. It is required in computer capture of video to synchronize the digitizing process with the scanning parameters of the video signal.

I/O INPUT/OUTPUT

Isochronous Used to describe information that is time sensitive and that is sent (preferably) without interruptions. Video and audio data sent in real time are isochronous.

JPEG JOINT PHOTOGRAPHIC EXPERT GROUP: A working committee under the auspices of the International Standards Organization that is defining a proposed universal standard for digital compression of still images for use in computer systems.

KB KILO BYTES: 1024 bytes.

LAN LOCAL AREA NETWORK: High-speed transmission over twisted pair, coax, or fiber optic cables that connect terminals, computers and peripherals together at distances of about a mile or less.

LRU LEAST RECENTLY USED

MPEG MOVING PICTURE EXPERTS GROUP: A working committee under the auspices of the International Standards Organization that is defining standards for the digital compression/decompression of motion video/audio. MPEG-1 is the initial standard and is in use. MPEG-2 will be the next standard and will support digital, flexible, scaleable video transport. It will cover multiple resolutions, bit rates and delivery mechanisms.

MPEG-1, MPEG-2 See MPEG

MRU MOST RECENTLY USED

MTNU MOST TIME TO NEXT USE

NTSC format NATIONAL TELEVISION STANDARDS COMMITTEE: The color television format that is the standard in the United States and Japan.

PAL format PHASE ALTERNATION LINE: The color television format that is the standard for Europe except for France.

PC PERSONAL COMPUTER: A relatively low cost computer that can be used for home or business.

RAID REDUNDANT ARRAY of INEXPENSIVE DISKS: A storage arrangement that uses several magnetic or optical disks working in tandem to increase bandwidth output and to provide redundant backup.

SCSI SMALL COMPUTER SYSTEM INTERFACE: An industry standard for connecting peripheral devices and their controllers to a computer.

SIF SOURCE INPUT FORMAT: One quarter the CCIR 601 resolution.

SMPTE SOCIETY OF MOTION PICTURE & TELEVISION ENGINEERS.

SSA SERIAL STORAGE ARCHITECTURE: A standard for connecting peripheral devices and their controllers to computers. A possible replacement for SCSI.

T1 Digital interface into the telephone network with a bit rate of 1.544 Mb/sec.

TCP/IP TRANSMISSION CONTROL PROTOCOL/INTERNET PROGRAM: A set of protocols developed by the Department of Defense to link dissimilar computers across networks.

VHS VERTICAL HELICAL SCAN: A common format for recording analog video on magnetic tape.

VTR VIDEO TAPE RECORDER: A device for recording video on magnetic tape.

VCR VIDEO CASSETTE RECORDER: Same as VTR.

A. GENERAL ARCHITECTURE

A video optimized stream server system 10 (hereafter referred to as media streamer) is shown in FIG. 1 and includes four architecturally distinct components to provide scaleability, high availability and configuration flexibility. The major components follow:

1) Low Latency Switch 12: a hardware/microcode component with a primary task of delivering data and control information between Communication Nodes 14, one or more Storage Nodes 16, 17 and one or more Control Nodes 18.

2) Communication Node 14: a hardware/microcode component with the primary task of enabling the "playing" (delivering data isochronously) or "recording" (receiving data isochronously) over an externally defined interface usually familiar to the broadcast industry: NTSC, PAL, D1, D2, etc. The digital-to-video interface is embodied in a video card contained in a plurality of video ports 15 connected at the output of each communication node 14.

3) Storage Node 16, 17: a hardware/microcode component with the primary task of managing a storage medium such as disk and associated storage availability options.

4) Control Node 18: a hardware/microcode component with the primary task of receiving and executing control commands from an externally defined subsystem interface familiar to the computer industry.

A typical media streamer with 64 nodes implementation might contain 31 communication nodes, 31 storage nodes, 2 control nodes interconnected with the low latency switch 12. A smaller system might contain no switch and a single hardware node that supports communications, storage and control functions. The design of media streamer 10 allows a small system to grow to a large system in the customer installation. In all configurations, the functional capability of media streamer 10 can remain the same except for the number of streams delivered and the number of multimedia hours stored.

Figure 1A:
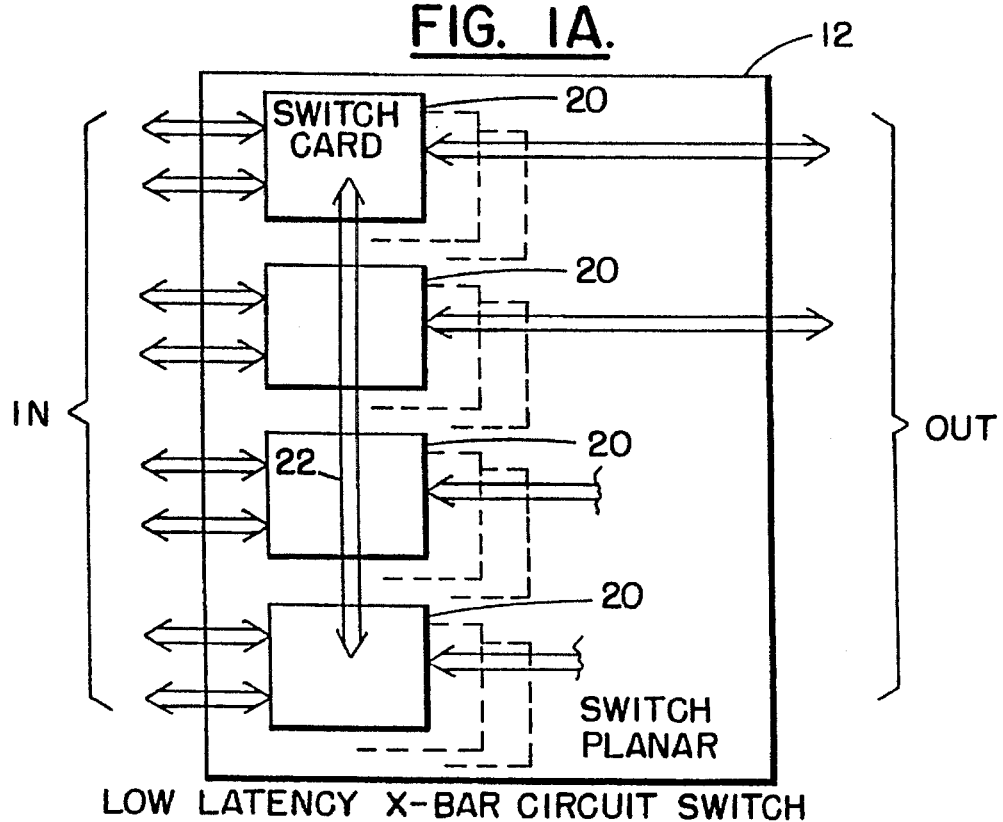
FIG. 1A is a block diagram which illustrates further details of a circuit switch shown in FIG. 1.

In FIG. 1A, further details of low latency switch 12 are shown. A plurality of circuit switch chips (not shown) are interconnected on crossbar switch cards 20 which are interconnected via a planar board (schematically shown). The planar and a single card 20 constitute a low latency crossbar switch with 16 node ports. Additional cards 20 may be added to configure additional node ports and, if desired, active redundant node ports for high availability. Each port of the low latency switch 12 enables, by example, a 25 megabyte per second, full duplex communication channel.

Information is transferred through the switch 12 in packets. Each packet contains a header portion that controls the switching state of individual crossbar switch points in each of the switch chips. The control node 18 provides the other nodes (storage nodes 16, 17 and communication nodes 14) with the information necessary to enable peer-to-peer operation via the low latency switch 12.

Figure 1B:
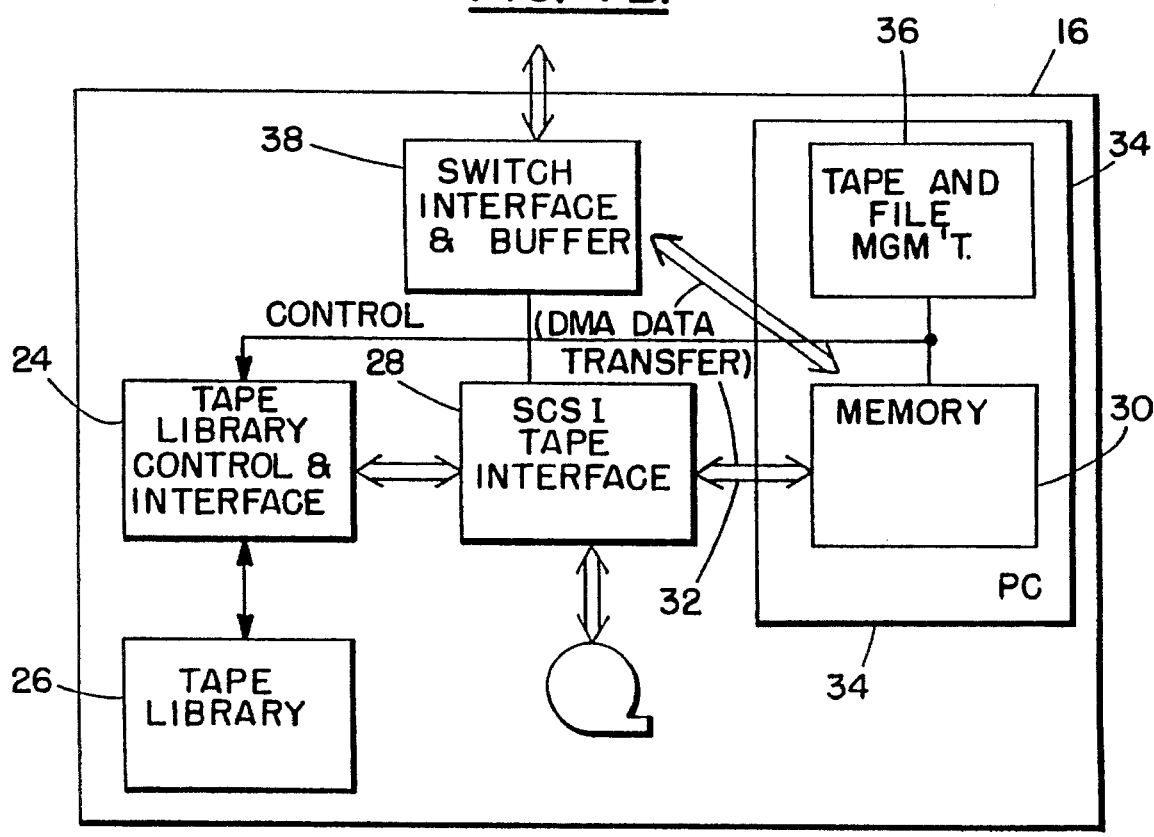
FIG. 1B is a block diagram which illustrates further details of a tape storage node shown in FIG. 1.

In FIG. 1B, internal details of a tape storage node 17 are illustrated. As will be hereafter understood, tape storage node 17 provides a high capacity storage facility for storage of digital representations of video presentations.

As employed herein a video presentation can include one or more images that are suitable for display and/or processing. A video presentation may include an audio portion. The one or more images may be logically related, such as sequential frames of a film, movie, or animation sequence. The images may originally be generated by a camera, by a digital computer, or by a combination of a camera and a digital computer. The audio portion may be synchronized with the display of succesive images. As employed herein a data representation of a video presentation can be any suitable digital data format for representing one or more images and possibly audio. The digital data may be encoded and/or compressed.

Referring again to FIG. 1B a tape storage node 17 includes a tape library controller interface 24 which enables access to multiple tape records contained in a tape library 26. A further interface 28 enables access to other tape libraries via an SCSI bus interconnection. An internal system memory 30 enables a buffering of video data received from either of interfaces 24 or 28, or via DMA data transfer path 32. System memory block 30 may be a portion of a PC 34 which includes software 36 for tape library and file management actions. A switch interface and buffer module 38 (used also in disk storage nodes 16, communication nodes 14, and control nodes 18) enables interconnection between the tape storage node 17 and low latency switch 12. That is, the module 38 is responsible for partitioning a data transfer into packets and adding the header portion to each packet that the switch 12 employs to route the packet. When receiving a packet from the switch 12 the module 38 is responsible for stripping off the header portion before locally buffering or otherwise handling the received data.

Video data from tape library 26 is entered into system memory 30 in a first buffering action. Next, in response to initial direction from control node 18, the video data is routed through low latency switch 12 to a disk storage node 16 to be made ready for substantially immediate access when needed.

In FIG. 1C, internal details of a disk storage node 16 are shown. Each disk storage node 16 includes a switch interface and buffer module 40 which enables data to be transferred from/to a RAID buffer video cache and storage interface module 42. Interface 42 passes received video data onto a plurality of disks 45, spreading the data across the disks in a quasi-RAID fashion. Details of RAID memory storage are known in the prior art and are described in "A Case for Redundant Arrays of Inexpensive Disks (RAID)", Patterson et al., ACM SIGMOD Conference, Chicago, Ill., Jun. 1–3, 1988 pages 109–116.

A disk storage node 16 further has an internal PC 44 which includes software modules 46 and 48 which, respectively, provide storage node control, video file and disk control, and RAID mapping for data stored on disks 45. In essence, each disk storage node 16 provides a more immediate level of video data availability than a tape storage node 17. Each disk storage node 16 further is enabled to buffer (in a cache manner) video data in a semiconductor memory of switch interface and buffer module 40 so as to provide even faster availability of video data, upon receiving a request therefor.

In general, a storage node includes a mass storage unit (or an interface to a mass storage unit) and a capability to locally buffer data read from or to be written to the mass storage unit. The storage node may include sequential access mass storage in the form of one or more tape drives and/or disk drives, and may include random access storage, such as one or more disk drives accessed in a random access fashion and/or semiconductor memory.

In FIG. 1D, a block diagram is shown of internal components of a communications node 14. Similar to each of the above noted nodes, communication node 14 includes a switch interface and buffer module 50 which enables communications with low latency switch 12 as described previously. Video data is directly transferred between switch interface and buffer module 50 to a stream buffer and communication interface 52 for transfer to a user terminal (not shown). A PC 54 includes software modules 56 and 58 which provide, respectively, communication node control (e.g., stream start/stop actions) and enable the subsequent generation of an isochronous stream of data. An additional input 60 to stream buffer and communication interface 52 enables frame synchronization of output data. That data is received from automation control equipment 62 which is, in turn, controlled by a system controller 64 that exerts overall operational control of the stream server 10 (see FIG. 1). System controller 64 responds to inputs from user control set top boxes 65 to cause commands to be generated that enable media streamer 10 to access a requested video presentation. System controller 64 is further provided with a user interface and display facility 66 which enables a user to input commands, such as by hard or soft buttons, and other data to enable an identification of video presentations, the scheduling of video presentations, and control over the playing of a video presentation.

Each control node 18 is configured as a PC and includes a switch interface module for interfacing with low latency switch 12. Each control node 18 responds to inputs from system controller 64 to provide information to the communication nodes 14 and storage nodes 16, 17 to enable desired interconnections to be created via the low latency switch 12. Furthermore, control node 18 includes software for enabling staging of requested video data from one or more of disk storage nodes 16 and the delivery of the video data, via a stream delivery interface, to a user display terminal. Control node 18 further controls the operation of both tape and disk storage nodes 16, 17 via commands sent through low latency switch 12.

The media streamer has three architected external interfaces, shown in FIG. 1. The external interfaces are:

1) Control Interface: an open system interface executing TCP/IP protocol (Ethernet LAN, TokenRing LAN, serial port, modem, etc.)

2) Stream Delivery Interface: one of several industry standard interfaces designed for the delivery of data streams (NTSC, D1, etc.).

3) Automation Control Interface: a collection of industry standard control interfaces for precise synchronization of stream outputs (GenLock, BlackBurst, SMPTE clock, etc.)

Application commands are issued to media streamer 10 over the control interface. When data load commands are issued, the control node breaks the incoming data file into segments (i.e. data blocks) and spreads it across one or more storage nodes. Material density and the number of simultaneous users of the data affect the placement of the data on storage nodes 16, 17. Increasing density and/or simultaneous users implies the use of more storage nodes for capacity and bandwidth.

When commands are issued over the control interface to start the streaming of data to an end user, control node 18 selects and activates an appropriate communication node 14 and passes control information indicating to it the location of the data file segments on the storage nodes 16, 17. The communications node 14 activates the storage nodes 16, 17 that need to be involved and proceeds to communicate with these nodes, via command packets sent through the low latency switch 12, to begin the movement of data.

Data is moved between disk storage nodes 16 and communication nodes 14 via low latency switch 12 and "just in time" scheduling algorithms. The technique used for scheduling and data flow control is more fully described below. The data stream that is emitted from a communication node interface 14 is multiplexed to/from disk storage nodes 16 so that a single communication node stream uses a fraction of the capacity and bandwidth of each disk storage node 16. In this way, many communication nodes 14 may multiplex access to the same or different data on the disk storage nodes 16. For example, media streamer 10 can provide 1500 individually controlled end user streams from the pool of communication nodes 14, each of which is multiplexing accesses to a single multimedia file spread across the disk storage nodes 16. This capability is termed "single copy multiple stream".

The commands that are received over the control interface are executed in two distinct categories. Those which manage data and do not relate directly to stream control are executed at "low priority". This enables an application to load new data into the media streamer 10 without interfering with the delivery of data streams to end users. The commands that affect stream delivery (i.e. output) are executed at "high priority".

The control interface commands are shown in FIG. 2. The low priority data management commands for loading and managing data in media streamer 10 include VS-CREATE, VS-OPEN, VS-READ, VS-WRITE, VS-GET_POSITION, VS-SET_POSITION, VS-CLOSE, VS-RENAME, VS-DELETE GET_ATTRIBUTES, and VS-GET_NAMES.

The high priority stream control commands for starting and managing stream outputs include VS-CONNECT, VS-PLAY, VS-RECORD, VS-SEEK, VS-PAUSE, VS-STOP and VS-DISCONNECT. Control node 18 monitors stream control commands to assure that requests can be executed. This "admission control" facility in control node 18 may reject requests to start streams when the capabilities of media streamer 10 are exceeded. This may occur in several circumstances:

1) when some component fails in the system that prevents maximal operation;

2) when a specified number of simultaneous streams to a data file (as specified by parameters of a VS-CREATE command) is exceeded; and 3) when a specified number of simultaneous streams from the system, as specified by an installation configuration, is exceeded.

The communication nodes 14 are managed as a heterogeneous group, each with a potentially different bandwidth (stream) capability and physical definition. The VS-CONNECT command directs media streamer 10 to allocate a communication node 14 and some or all of its associated bandwidth enabling isochronous data stream delivery. For example, media streamer 10 can play uncompressed data stream(s) through communication node(s) 14 at 270 MBits/Sec while simultaneously playing compressed data stream(s) at much lower data rates (usually 1–16 Mbits/Sec) on other communication nodes 14.

Storage nodes 16, 17 are managed as a heterogeneous group, each with a potentially different bandwidth (stream) capability and physical definition. The VS-CREATE command directs media streamer 10 to allocate storage in one or more storage nodes 16, 17 for a multimedia file and its associated metadata. The VS-CREATE command specifies both the stream density and the maximum number of simultaneous users required.

Three additional commands support automation control systems in the broadcast industry: VS-CONNECT-LIST, VS-PLAY-AT-SIGNAL and VS-RECORD-AT-SIGNAL. VS-CONNECT-LIST allows applications to specify a sequence of play commands in a single command to the subsystem. Media streamer 10 will execute each play command as if it were issued over the control interface but will transition between the delivery of one stream and the next seamlessly. An example sequence follows:

1) Control node 18 receives a VS-CONNECT-LIST command with play subcommands indicating that all or part of FILE1, FILE2 and FILE3 are to be played in sequence. Control node 18 determines the maximum data rate of the files and allocates that resource on a communication node 14. The allocated communication node 14 is given the detailed play list and initiates the delivery of the isochronous stream.

2) Near the end of the delivery of FILE1, the communication node 14 initiates the delivery of FILE2 but it does not enable it to the output port of the node. When FILE1 completes or a signal from the Automation Control Interface occurs, the communication node 14 switches the output port to the second stream from the first. This is done within 1/30th of a second or within one standard video frame time.

3) The communication node 14 deallocates resources associated with FILE1.

VS-PLAY-AT-SIGNAL and VS-RECORD-AT-SIGNAL allow signals from the external Automation Control Interface to enable data transfer for play and record operations with accuracy to a video fame boundary. In the previous example, the VS-CONNECT-LIST includes a PLAY-AT-SIGNAL subcommand to enable the transition from FILE1 to FILE2 based on the external automation control interface signal. If the subcommand were VS-PLAY instead, the transition would occur only when the FILE1 transfer was completed.

Other commands that media streamer 10 executes provide the ability to manage storage hierarchies. These commands are: VS-DUMP, VS-RESTORE, VS-SEND, VS-RECEIVE and VS-RECEIVE_AND_PLAY. Each causes one or more multimedia files to move between storage nodes 16 and two externally defined hierarchical entities.

1) VS-DUMP and VS-RESTORE enable movement of data between disk storage nodes 16, and a tape storage unit 17 accessible to control node 18. Data movement may be initiated by the controlling application or automatically by control node 18.

2) VS-SEND and VS-RECEIVE provide a method for transmitting a multimedia file to another media streamer. Optionally, the receiving media streamer can play the incoming file immediately to a preallocated communication node without waiting for the entire file.

In addition to the modular design and function set defined in the media streamer architecture, data flow is optimized for isochronous data transfer to significantly reduce cost. In particular:

1) bandwidth of the low latency switch exceeds that of the attached nodes; communications between nodes is nearly non-blocking;

2) data movement into processor memory is avoided, more bandwidth is provided;

3) processing of data is avoided; expensive processing units are eliminated; and 4) data movement is carefully scheduled so that; large data caches are avoided.

In traditional computer terms, media streamer 10 functions as a system of interconnected adapters with an ability to perform peer-peer data movement between themselves through the low latency switch 12. The low latency switch 12 has access to data storage and moves data segments from one adapter's memory to that of another without a "host computer" intervention.

B. HIERARCHICAL MANAGEMENT OF DIGITAL COMPRESSED VIDEO DATA FOR ISOCHRONOUS DELIVERY

Media streamer 10 provides hierarchical storage elements. It exhibits a design that allows scalability from a very small video system to a very large system. It also provides a flexibility for storage management to adapt to the varied requirements necessary to satisfy functions of Video on Demand, Near Video on Demand, Commercial insertion, high quality uncompressed video storage, capture and playback.

B1. TAPE STORAGE

In media streamer 10, video presentations are moved from high performance digital tape to disk, to be played out at the much lower data rate required by the end user. In this way, only a minimum amount of video time is stored on the disk subsystem If the system is "Near Video on Demand", then only, by example, 5 minutes of each movie need be in disk storage at any one time. This requires only 22 segments of 5 minutes each for a typical 2 hour movie. The result is that the total disk storage requirement for a video presentation is reduced, since not all of the video presentation is kept on the disk file at any one time. Only that portion of the presentation that is being played need be present in the disk file.

In other words, if a video presentation requires a time T to present in its entirety, and is stored as a digital representation having N data blocks, then each data block stores a portion of the video presentation that corresponds to approximately a T/N period of the video presentation. A last data block of the N data blocks may store less than a T/N period.

As demand on the system grows and the number of streams increases, the statistical average is that about 25% of video stream requests will be for the same movie, but at different sub-second time intervals, and the distribution of viewers will be such that more than 50% of those sub-second demands will fall within a group of 15 movie segments.

An aspect of this invention is the utilization of the most appropriate technology that will satisfy this demand. A random access cartridge loader (such as produced by the IBM Corporation) is a digital tape system that has high storage capacity per tape, mechanical robotic loading of 100 tapes per drawer, and up to 2 tape drives per drawer. The result is an effective tape library for movie-on-demand systems. However, the invention also enables very low cost digital tape storage library systems to provide the mass storage of the movies, and further enables low demand movies to be played directly from tape to speed-matching buffers and then on to video decompression and distribution channels.

A second advantage of combining hierarchical tape storage to any video system is that it provides rapid backup to any movie that is stored on disk, in the event that a disk becomes inoperative. A typical system will maintain a "spare" disk such that if one disk unit fails, then movies can be reloaded from tape. This would typically be combined with a RAID or a RAID-like system.

B2. DISK STORAGE SYSTEMS

When demand for video streams increases to a higher level, it becomes more efficient to store an entire movie on disk and save the system performance overhead required to continually move video data from tape to disk. A typical system will still contain a library of movies that are stored on tape, since the usual number of movies in the library is 10× to 100× greater than the number that will be playing at any one time. When a user requests a specific movie, segments of it are loaded to a disk storage node 16 and started from there.

When there are large numbers of users wanting to see the same movie, it is beneficial to keep the movie on disk. These movies are typically the "Hot" movies of the current week and are pre-loaded from tape to disk prior to peak viewing hours. This tends to reduce the work load on the system during peak hours.

B3. MOVIES OUT OF CACHE

As demand for "hot" movies grows, media streamer 10, through an MRU-based algorithm, decides to move key movies up into cache. This requires substantial cache memory, but in terms of the ratio of cost to the number of active streams, the high volume that can be supported out of cache lowers the total cost of the media streamer 10.

Because of the nature of video data, and the fact that the system always knows in advance what videos are playing and what data will be required next, and for how long, methods are employed to optimize the use of cache, internal buffers, disk storage, the tape loader, bus performance, etc.

Algorithms that control the placement and distribution of the content across all of the storage media enable delivery of isochronous data to a wide spectrum of bandwidth requirements. Because the delivery of isochronous data is substantially 100% predictable, the algorithms are very much different from the traditional ones used for other segments of the computer industry where caching of user-accessed data is not always predictable.

C. MEDIA STREAMER DATA FLOW ARCHITECTURE

As indicated above, media streamer 10 delivers video streams to various outputs such as TV sets and set top boxes attached via a network, such as a LAN, ATM, etc. To meet the requirements for storage capacity and the number of simultaneous streams, a distributed architecture consisting of multiple storage and communication nodes is preferred. The data is stored on storage nodes 16, 17 and is delivered by communication nodes. A communication node 14 obtains the data from appropriate storage nodes 16, 17. The control node 18 provides a single system image to the external world. The nodes are connected by the cross-connect, low latency switch 12.

Data rates and the data to be delivered is predictable for each stream. The invention makes use of this predictability to construct a data flow architecture that makes full use of resources and which insures that the data for each stream is available at every stage when it is needed.

Data flow between the storage nodes 16, 17 and the communication nodes 14 can be set up in a number of different ways.

A communication node 14 is generally responsible for delivering multiple streams. It may have requests outstanding for data for each of these streams, and the required data may come from different storage nodes 16,17. If different storage nodes were to attempt, simultaneously, to send data to the same communication node, only one storage node would be able to send the data, and the other storage nodes would be blocked. The blockage would cause these storage nodes to retry sending the data, degrading switch utilization and introducing a large variance in the time required to send data from a storage node to the communication node. In this invention, there is no contention for an input port of a communication node 14 among different storage nodes 16, 17.

The amount of required buffering can be determined as follows: the communication node 14 determines the mean time required to send a request to the storage node 16, 17 and receive the data. This time is determined by adding the time to send a request to the storage node and the time to receive the response, to the time needed by the storage node to process the request. The storage node in turn determines the mean time required to process the request by adding the mean time required to read the data from disk and any delays involved in processing the request. This is the latency in processing the request. The amount of buffering required is the memory storage needed at the stream data rate to cover the latency. The solution described below takes advantage of special conditions in the media streamer environment to reduce latency and hence to reduce the resources required. The latency is reduced by using a just-in-time scheduling algorithm at every stage of the data (e.g., within storage nodes and communications nodes), in conjunction with anticipating requests for data from the previous stage.

Contention by the storage nodes 16, 17 for the input port of a communication node 14 is eliminated by employing the following two criterion:

1) A storage node 16, 17 only sends data to a communication node 14 on receipt of a specific request.

2) A given communication node 14 serializes all requests for data to be read from storage nodes so that only one request for receiving data from the communication node 14 is outstanding at any time, independent of the number of streams the communication node 14 is delivering.

As was noted above, the reduction of latency relies on a just-in-time scheduling algorithm at every stage. The basic principle is that at every stage in the data flow for a stream, the data is available when the request for that data arrives. This reduces latency to the time needed for sending the request and performing any data transfer.

Thus, when the control node 18 sends a request to the storage node 16 for data for a specific stream, the storage node 16 can respond to the request almost immediately. This characteristic is important to the solution to the contention problem described above.

Since, in the media streamer environment, access to data is sequential and the data rate for a stream is predictable, a storage node 16 can anticipate when a next request for data for a specific stream can be expected. The identity of the data to be supplied in response to the request is also known. The storage node 16 also knows where the data is stored and the expected requests for the other streams. Given this information and the expected time to process a read request from a disk, the storage node 16 schedules a read operation so that the data is available just before the request from the communication node 14 arrives. For example, if the stream data rate is 250 KB/sec, and a storage node 16 contains every 4th segment of a video, requests for data for that stream will arrive every 4 seconds. If the time to process a read request is 500 msec (with the requisite degree of confidence that the read request will complete in 500 msec) then the request is scheduled for at least 500 msec before the anticipated receipt of request from the communication node 14.

C1. CONTROL NODE 18 FUNCTIONS

The control node 18 function is to provide an interface between media streamer 10 and the external world for control flow. It also presents a single system image to the external world even if the media streamer 10 is itself implemented as a distributed system. The control node functions are implemented by a defined Application Program Interface (API). The API provides functions for creating the video content in media streamer 10 as well as for real-time functions such as playing/recording of video data.

The control node 18 forwards real-time requests to play or stop the video to the communication nodes 14.

C2. COMMUNICATION NODE 14

A communication node 14 has the following threads (in the same process) dedicated to handle a real time video interface: a thread to handle connect/disconnect requests, a thread to handle play/stop and pause/resume requests, and a thread to handle a jump request (seek forward or seek backward). In addition it has an input thread that reads data for a stream from the storage nodes 16 and an output thread that writes data to the output ports.

A data flow structure in a communication node 14 for handling data during the playing of a video is depicted in FIG. 3. The data flow structure includes an input thread 100 that obtains data from a storage node 16. The input thread 100 serializes receipt of data from storage nodes so that only one storage node is sending data at any one time. The input thread 100 ensures that when an output thread 102 needs to write out of a buffer for a stream, the buffer is already filled with data. In addition, there is a scheduler function 104 that schedules both the input and output operations for the streams. This function is used by both the input and output threads 100 and 102.

Each thread works off a queue of requests. The request queue 106 for the output thread 102 contains requests that identify the stream and that points to an associated buffer that needs to be emptied. These requests are arranged in order by a time at which they need to be written to the video output interface. When the output thread 102 empties a buffer, it marks it as empty and invokes the scheduler function 104 to queue the request in an input queue 108 for the stream to the input thread (for the buffer to be filled). The queue 108 for the Input thread 100 is also arranged in order by a time at which buffers need to be filled.

Input thread 100 also works off the request queue 108 arranged by request time. Its task is to fill the buffer from a storage node 16. For each request in its queue, the input thread 100 takes the following actions. The input thread 100 determines the storage node 16 that has the next segment of data for the stream (the data for a video stream is preferably striped across a number of storage nodes). The input thread 100 then sends a request to the determined storage node (using messages through switch 12) requesting data for the stream, and then waits for the data to arrive.

This protocol ensures that only one storage node 16 will be sending data to a particular communications node 14 at any time, i.e., it removes the conflict that may arise if the storage nodes were to send data asynchronously to a communications node 14. When the requested data is received from the storage node 16, the input thread 100 marks the buffer as full and invokes the scheduler 104 to buffer a request (based on the stream's data rate) to the output thread 102 to empty the buffer.

C3. STORAGE NODE 16

The structure of the storage node 16 for data flow to support the playing of a stream is depicted in FIG. 4. The storage node 16 has a pool of buffers that contain video data. It has an input thread 110 for each of the logical disk drives and an output thread 112 that writes data out to the communications nodes 14 via the switch matrix 12. It also has a scheduler function 114 that is used by the input and output threads 110, 112 to schedule operations. It also has a message thread 116 that processes requests from communications nodes 14 requesting data.

When a message is received from a communications node 14 requesting data, the message thread 116 will normally find the requested data already buffered, and queues the request (queue 118) to the output thread. The requests are queued in time order. The output thread 112 will empty the buffer and add it to the list of free buffers. Each of the input threads 110 have their own request queues. For each of the active streams that have video data on the associated disk drive, a queue 120 ordered by request time (based on the data rate, level of striping, etc.) to fill the next buffer is maintained. The thread takes the first request in queue 120, associates a free buffer with it and issues an I/O request to fill the buffer with the data from the disk drive. When the buffer is filled, it is added to the list of full buffers. This is the list that is checked by the message thread 116 when the request for data for the stream is received. When a message for data is received from a communication node 14 and the required buffer is not full, it is considered to be a missed deadline.

C4. JUST-IN-TIME SCHEDULING

A just-in-time scheduling technique is used in both the communications nodes 14 and the storage nodes 16. The technique employs the following parameters:

bc=buffer size at the communications node 14;

bs=buffer size at the storage node 16;

r=video stream data rate;

n=number of stripes of video containing the data for the video stream;

sr=stripe data rate; and sr=r/n.

The algorithm used is as follows:

(1) sfc=frequency of requests at the communications node for a stream=r/bc; and (2) dfc=frequency of disk read requests at the Storage Node=sr/bs.

The "striping" of video data is described in detail below in section H.

The requests are scheduled at a frequency determined by the expressions given above, and are scheduled so that they complete in advance of when the data is needed. This is accomplished by "priming" the data pipe with data at the start of playing a video stream.

Calculations of sfc and dfc are made at connect time, in both the communication node 14 playing the stream and the storage nodes 16 containing the video data. The frequency (or its inverse, the interval) is used in scheduling input from disk in the storage node 16 (see FIG. 4) and in scheduling the output to the port (and input from the storage nodes) in the communication node 14 (see FIG. 3).

Example of Just-In-Time Scheduling:

Play a stream at 2.0 mbits/sec (250,000 bytes/sec.) from a video striped on four storage nodes. Also assume that the buffer size at the communication node is 50,000 bytes and the buffer size at the disk node is 250,000 bytes. Also, assume that the data is striped in segments of 250,000 bytes/sec.

The values for the various parameters in the Just-In-Time algorithm are as follows:

bc=250,000 bytes (buffer size at the communication node 14);

bs=250,000 bytes (buffer size at the storage node) 16;

r=250,000 bytes/sec (stream data rate);

n=4 (number of stripes that video for the stream is striped over);

sr=r/n=6250 bytes/sec. or 250,000/4 sec., i.e. 250,000 bytes every four seconds;

sfc=r/bc=1/sec, (frequency of requests at the communication node 14); and dfc=r/bs=1/sec. (frequency of requests at the storage node 16).

The communication node 14 responsible for playing the stream will schedule input and output requests at the frequency of 1/sec. or at intervals of 1.0 seconds. Assuming that the communication node 14 has two buffers dedicated for the stream, the communication node 14 ensures that it has both buffers filled before it starts outputting the video stream.

At connect time the communication node 14 will have sent messages to all four storage nodes 16 containing a stripe of the video data. The first two of the storage nodes will anticipate the requests for the first segment from the stripes and will schedule disk requests to fill the buffers. The communication node 14 will schedule input requests (see FIG. 3) to read the first two segments into two buffers, each of size 250,000 bytes. When a play request comes, the communication node 14 will first insure that the two buffers are full, and then informs all storage nodes 16 that play is about to commence. It then starts playing the stream. When the first buffer has been output (which at 2 Mbits/sec. (or 250,000 bytes/sec.) will take one second), the communication node 14 requests data from a storage node 16. The communication node 14 then requests data from each of the storage nodes, in sequence, at intervals of one second, i.e. it will request data from a specific storage node at intervals of four seconds. It always requests 250,000 bytes of data at a time. The calculations for the frequency at which a communication node requests data from the storage nodes 16 is done by the communication node 14 at connect time.

The storage nodes 16 anticipate the requests for the stream data as follows. The storage node 16 containing stripe 3 (see section H below) can expect a request for the next 250,000 byte segment one second after the play has commenced, and every four seconds thereafter. The storage node 16 containing stripe 4 can expect a request two seconds after the play has commenced and every four seconds thereafter. The storage node 16 containing stripe 2 can expect a request four seconds after play has commenced and four seconds thereafter. That is, each storage node 16 schedules the input from disk at a frequency of 250,000 bytes every four seconds from some starting time (as described above). The scheduling is accomplished in the storage node 16 after receipt of the play command and after a buffer for the stream has been output. The calculation of the request frequency is done at the time the connect request is received.

It is also possible to use different buffer sizes at the communication node 14 and the storage node 16. For example, the buffer size at the communication node 14 may be 50,000 bytes and the buffer size at the storage node 16 may be 250,000 bytes. In this case, the frequency of requests at the communication node 14 will be (250,000/50,000) 5/sec. or every 0.2 seconds, while the frequency at the storage node 16 will remain at 1/sec. The communication node 14 reads the first two buffers (100,000 bytes) from the storage node containing the first stripe (note that the segment size is 250,000 bytes and the storage node 16 containing the first segment will schedule the input from disk at connect time). When play commences, the communication node 14 informs the storage nodes 16 of same and outputs the first buffer. When the buffer empties, the communication node 14 schedules the next input. The buffers will empty every 0.2 seconds and the communication node 14 requests input from the storage nodes 16 at that frequency, and also schedules output at the same frequency.

In this example, storage nodes 16 can anticipate five requests to arrive at intervals of 0.2 seconds (except for the first segment where 100,000 bytes have been already read, so initially three request will come after commencement of play every four seconds, i.e., the next sequence of five requests (each for 50,000 bytes) will arrive four seconds after the last request of the previous sequence). Since, the buffer size at the storage node is 250,000 bytes, the storage nodes 16 will schedule the input from disk every four seconds (just as in the example above).

C5. DETAILS OF A PLAY ACTION

The following steps trace the control and data flow for the playing action of a stream. The steps are depicted in FIG. 5 for setting up a video for play. The steps are in time order.

1. The user invokes a command to setup a port with a specific video that has been previously loaded. The request is sent to the control node 18.
2. A thread in the control node 18 receives the request and a VS-CONNECT function.
3. The control node thread opens a catalog entry for the video, and sets up a memory descriptor for the video with the striped file information.
4. The control node 18 allocates a communication node 14 and an output port on that node for the request.
5. Then control node 18 sends a message to the allocated communication node 14.
6. A thread in the communication node 14 receives the message from the control node 18.
7. The communication node thread sends an open request to the storage node 16 containing the stripe files.
8,9. A thread in each storage node 16 that the open request is sent to receive the request and opens the requested stripe file and allocate any needed resources, as well as scheduling input from disk (if the stripe file contains the first few segments).
10. The storage node thread sends a response back to the communication node 14 with the handle (identifier) for the stripe file.
11. The thread in the communication node 14 waits on responses from all of the storage nodes involved and on receiving successful responses allocates resources for the stream, including setting up the output port.
12. The communication node 14 then schedules input to prime the video data pipeline.
13. The communication node 14 then sends a response back to the control node 18.
14. The control node thread on receipt of a successful response from the communication node 14 returns a handle for the stream to the user be used in subsequent requests related to this instance of the stream.

The following are the steps in time order for the actions that are taken on receipt of the play request after a video stream has been successfully set up. The steps are depicted in FIG. 6.

1. The user invokes the play command.
2. A thread in the control node 18 receives the request.
3. The thread in the control node 18 verifies that the request is for a stream that is set up, and then sends a play request to the allocated communication node 14.
4. A thread in the communication node 14 receives the play request.
5. The communication node 14 sends the play request to all of the involved storage nodes 16 so that they can schedule their own operations in anticipation of subsequent requests for this stream. An "involved" storage node is one that stores at least one stripe of the video presentation of interest.
6. A thread in each involved storage node 16 receives the request and sets up schedules for servicing future requests for the stream. Each involved storage node 16 sends a response back to the communication node 14.
7. The communication node thread ensures that the pipeline is primed (preloaded with video data) and enables the stream for output.
8. The communication node 14 then sends a response back to the control node 18.
9. The control node 18 sends a response back to the user that the stream is playing.

The input and output threads continue to deliver the video presentation to the specified port until a stop/pause command is received or the video completes.

D. USER AND APPLICATION INTERFACES TO MEDIA STREAMER

Figure 7:
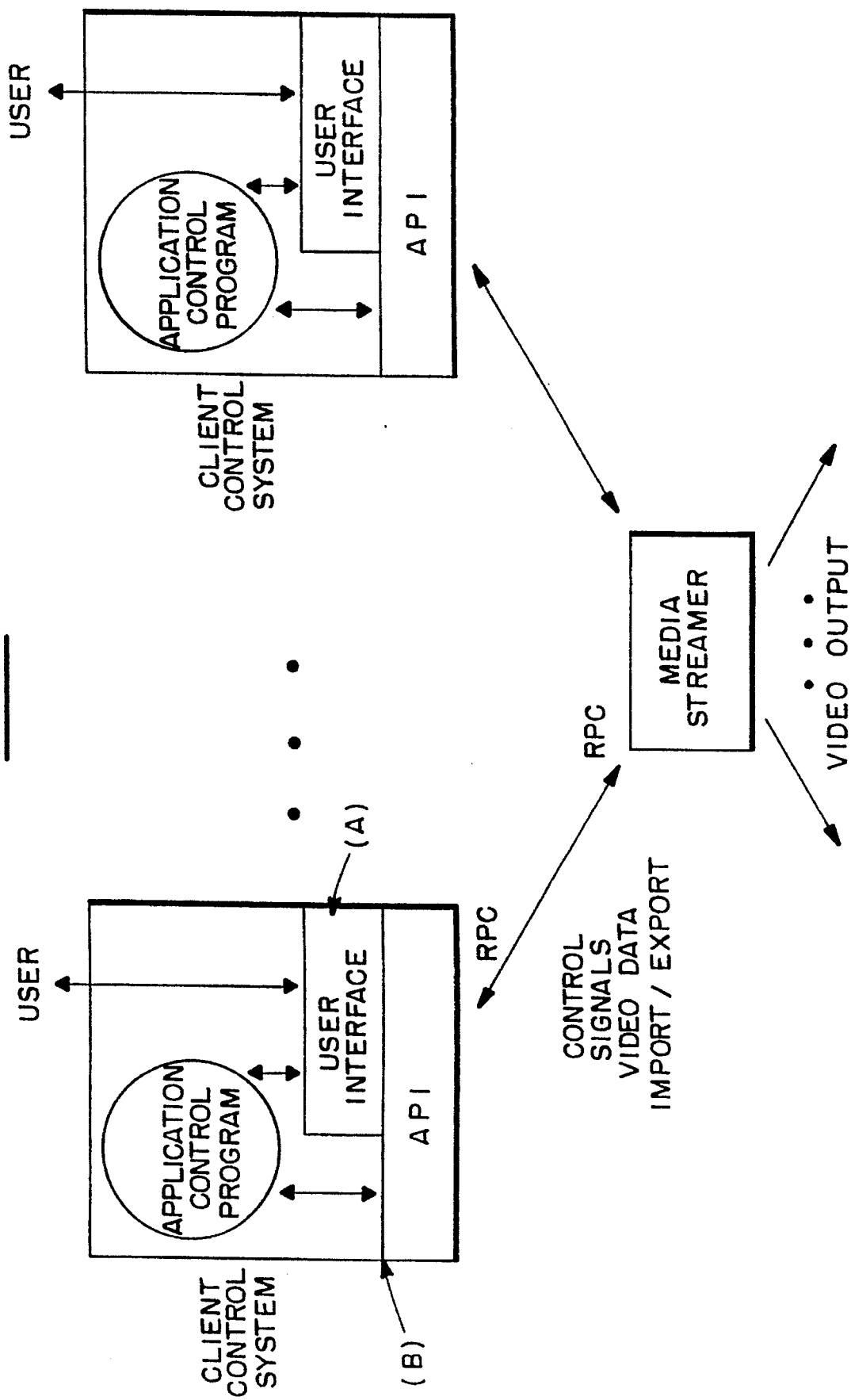
FIG. 7 illustrates interfaces which exist between the media streamer and client control systems.

Media streamer 10 is a passive server, which performs video server operations when it receives control commands from an external control system. FIG. 7 shows a system configuration for media streamer 10 applications and illustrates the interfaces present in the system.

Media streamer 10 provides two levels of interfaces for users and application programs to control its operations:

a user interface ((A) in FIG. 7); and an application program interface ((B) in FIG. 7).

Both levels of interface are provided on client control systems, which communicate with the media streamer 10 through a remote procedure call (RPC) mechanism. By providing the interfaces on the client control systems, instead of on the media streamer 10, the separation of application software from media streamer 10 is achieved. This facilitates upgrading or replacing the media streamer 10, since it does not require changing or replacing the application software on the client control system.

D1. USER COMMUNICATIONS
Media streamer 10 provides two types of user interfaces:

a command line interface; and a graphical user interface.

D1.1. COMMAND LINE INTERFACE

The command line interface displays a prompt on the user console or interface (65,66 of FIG. 1). After the command prompt, the user enters a command, starting with a command keyword followed by parameters. After the command is executed, the interface displays a prompt again and waits for the next command input. The media streamer command line interface is especially suitable for the following two types of operations:

Batch Control: Batch control involves starting execution of a command script that contains a series of video control commands. For example, in the broadcast industry, a command script can be prepared in advance to include prerecorded, scheduled programs for an extended period of time. At the scheduled start time, the command script is executed by a single batch command to start broadcasting without further operator intervention.

Automatic Control: Automatic control involves executing a list of commands generated by a program to update/play materials stored on media streamer 10. For example, a news agency may load new materials into the media streamer 10 every day. An application control program that manages the new materials can generate media streamer commands (for example, Load, Delete, Unload) to update the media streamer 10 with the new materials. The generated commands may be piped to the command line interface for execution.

D1.2 GRAPHICAL USER INTERFACE

Figure 8:
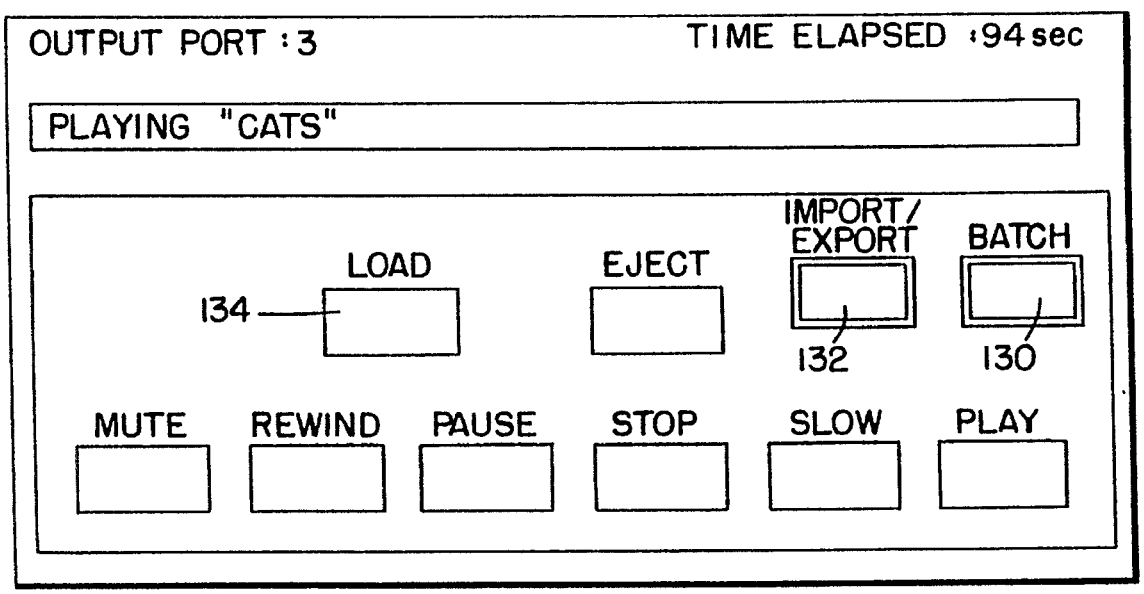
FIG. 8 illustrates a display panel showing a plurality of "soft" keys used to operate the media streamer.

FIG. 8 is an example of the media streamer graphical user interface. The interface resembles the control panel of a video cassette recorder, which has control buttons such as Play, Pause, Rewind, and Stop. In addition, it also provides selection panels when an operation involves a selection by the user (for example, load requires the user to select a video presentation to be loaded.) The graphical user interface is especially useful for direct user interactions.

A "Batch" button 130 and an "Import/Export" button 132 are included in the graphical user interface. Their functions are described below.

D2. USER FUNCTIONS

Media streamer 10 provides three general types of user functions:

Import/Export;

VCR-like play controls; and

Advanced user controls.

D2.1. IMPORT/EXPORT

Import/Export functions are used to move video data into and out of the media streamer 10. When a video is moved into media streamer 10 (Import) from the client control system, the source of the video data is specified as a file or a device of the client control system. The target of the video data is specified with a unique name within media streamer 10. When a video is moved out of media streamer 10 (Export) to the client control system, the source of the video data is specified by its name within media streamer 10, and the target of the video data is specified as a file or a device of the client control system.

In the Import/Export category of user functions, media streamer 10 also provides a "delete" function to remove a video and a "get attributes" function to obtain information about stored videos (such as name, data rate).

To invoke Import/Export functions through the graphical user interface, the user clicks on the "Import/Export" soft button 132 (FIG. 8). This brings up a new panel (not shown) that contains "Import", "Export", "Delete", "Get Attribute" buttons to invoke the individual functions.

D2.2. VCR-LIKE PLAY CONTROLS

Media streamer 10 provides a set of VCR-like play controls. The media streamer graphical user interface in FIG. 8 shows that the following functions are available: Load, Eject, Play, Slow, Pause, Stop, Rewind, Fast Forward and Mute. These functions are activated by clicking on the corresponding soft buttons on the graphical user interface. The media streamer command line interface provides a similar set of functions:

Setup—sets up a video for a specific output port. Analogous to loading a video cassette into a VCR.

Play—initiates playing a video that has been set up or resumes playing a video that has been paused.

Pause—pauses playing a video.

Detach—analogous to ejecting a video cassette from a VCR.

Status—displays the status of ports, such as which video is playing, elapsed playing time, etc.

D2.3 ADVANCED USER CONTROLS

In order to support specific application requirements, such as the broadcasting industry, the present invention provides several advanced user controls:

Play list—set up multiple videos and their sequence to be played on a port

Play length—limit the time a video will be played

Batch operation—perform a list of operations stored in a command file.

Figure 9:
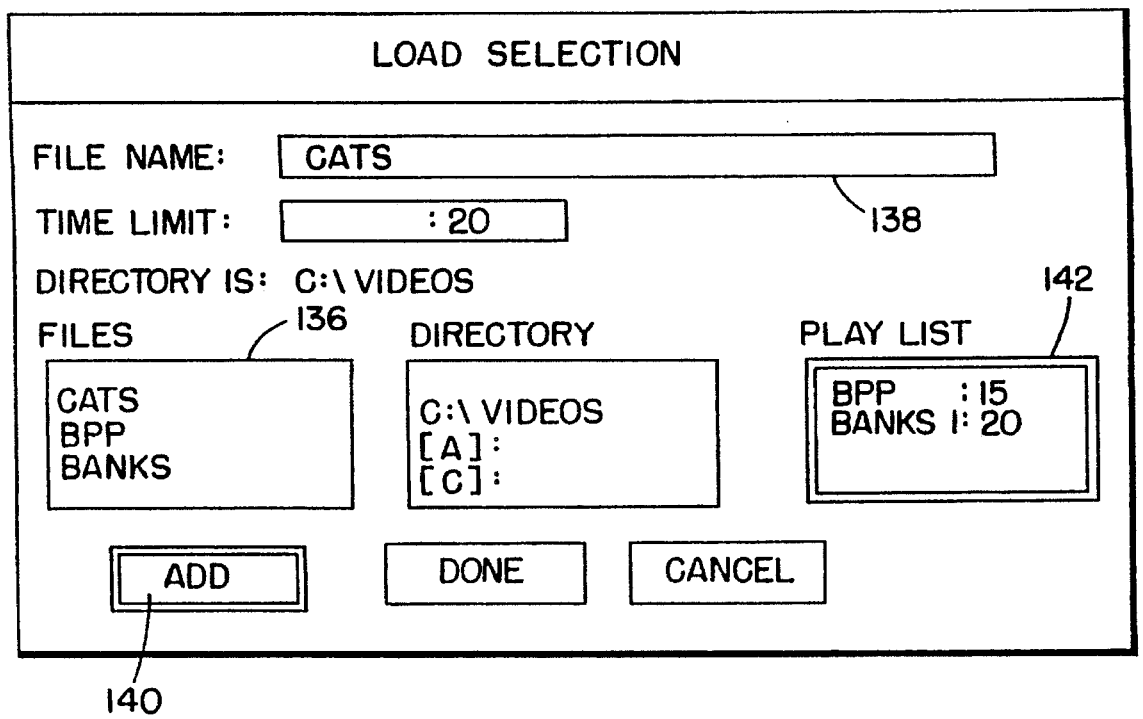
FIG. 9 illustrates a load selection panel that is displayed upon selection of the load soft key on FIG. 8.

The Play list and Play length controls are accomplished with a "Load" button 134 on the graphical user interface. Each "setup" command will specify a video to be added to the Play list for a specific port. It also specifies a time limit that the video will be played. FIG. 9 shows the panel which appears in response to clicking on the "load" soft button 134 on the graphical user interface to select a video to be added to the play list and to specify the time limit for playing the video. When the user clicks on a file name in the "Files" box 136, the name is entered into "File Name" box 138. When the user clicks on the "Add" button 140, the file name in "File Name" box 138 is appended to the "Play List" box 142 with its time limit and displays the current play list (with time limit of each video on the play list).

The batch operation is accomplished by using a "Batch" soft button 130 on the graphical user interface (see FIG. 8).

Figure 10:
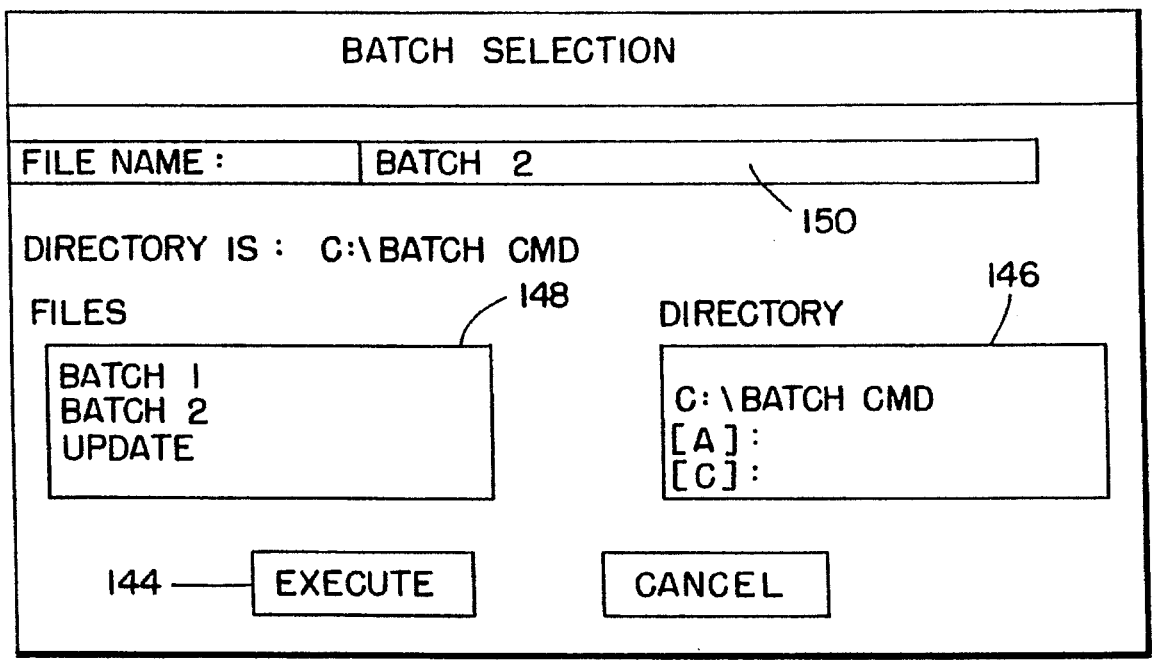
FIG. 10 illustrates a batch selection panel that is displayed when the batch key in FIG. 8 is selected.

When the "Batch" button 130 is activated, a batch selection panel is displayed for the user to select or enter the command file name (see FIG. 10). Pressing an "Execute" button 144 on the batch selection panel starts the execution of the commands in the selected command file. FIG. 10 is an example of the "Batch" and "Execute" operation on the graphical user interface. For example, the user has first created a command script in a file "batch2" in the c:/batch-cmd directory. The user then clicks on "Batch" button 130 on the graphical user interface shown in FIG. 8 to bring up the Batch Selection panel. Next, the user clicks on "c:/batchcmd" in "Directory" box 146 of the Batch Selection panel. This results in the display of a list of files in "Files" box 148. Clicking on the "batch2" line in "Files" box 148 enters it into the "File Name" box 150. Finally, the user clicks on the "Execute" button 144 to execute in sequence the commands stored in the "batch2" file.

D3. APPLICATION PROGRAM INTERFACE

Media streamer 10 provides the above-mentioned Application Program Interface (API) so that application control programs can interact with media streamer 10 and control its operations (reference may be made again to FIG. 7).

The API consists of remote procedure call (RPC)-based procedures. Application control programs invoke the API functions by making procedure calls. The parameters of the procedure call specify the functions to be performed. The application control programs invoke the API functions without regarding the logical and physical location of media streamer 10. The identity of a media streamer 10 to provide the video services is established at either the client control system startup time or, optionally, at the application control program initiation time. Once the identity of media streamer 10 is established, the procedure calls are directed to the correct media streamer 10 for servicing.

Except as indicated below, API functions are processed synchronously, i.e., once a function call is returned to the caller, the function is completed and no additional processing at media streamer 10 is needed. By configuring the API functions as synchronous operations, additional processing overheads for context switching, asynchronous signalling and feedbacks are avoided. This performance is important in video server applications due to the stringent real-time requirements.

The processing of API functions is performed in the order that requests are received. This ensures that user operations are processed in the correct order. For example, a video must be connected (setup) before it can be played. Another example is that switching the order of a "Play" request followed by a "Pause" request will have a completely different result to the user.

A VS-PLAY function initiates the playing of the video and returns the control to the caller immediately (without waiting until the completion of the video play). The rationale for this architecture is that since the time for playing a video is typically long (minutes to hours) and unpredictable (there may be pause or stop commands), by making the VS-PLAY function asynchronous, it frees up the resources that would otherwise be allocated for an unpredictably, long period of time.

At completion of video play, media streamer 10 generates an asynchronous call to a system/port address specified by the application control program to notify the application control program of the video completion event. The system/port address is specified by the application control program when it calls the API VS-CONNECT function to connect the video. It should be noted that the callback system/port address for VS-PLAY is specified at the individual video level. That means the application control programs have the freedom of directing video completion messages to any control point. For example, one application may desire the use of one central system/port to process the video completion messages for many or all of the client control systems. In another application, several different system/port addresses may be employed to process the video completion messages for one client control system.

With the API architecture, media streamer 10 is enabled to support multiple concurrent client control systems with heterogeneous hardware and software platforms, with efficient processing of both synchronous and asynchronous types of operations, while ensuring the correct sequencing of the operation requests. For example, the media streamer 10 may use an IBM OS/2 operating system running on a PS/2 system, while a client control system may use an IBM AIX operating system running on an RS/6000 system (IBM, OS/2, PS/2, AIX, and RS/6000 are all trademarks of the International Business Machines Corporation).

D4. CLIENT/MEDIA STREAMER COMMUNICATIONS

Figure 11:
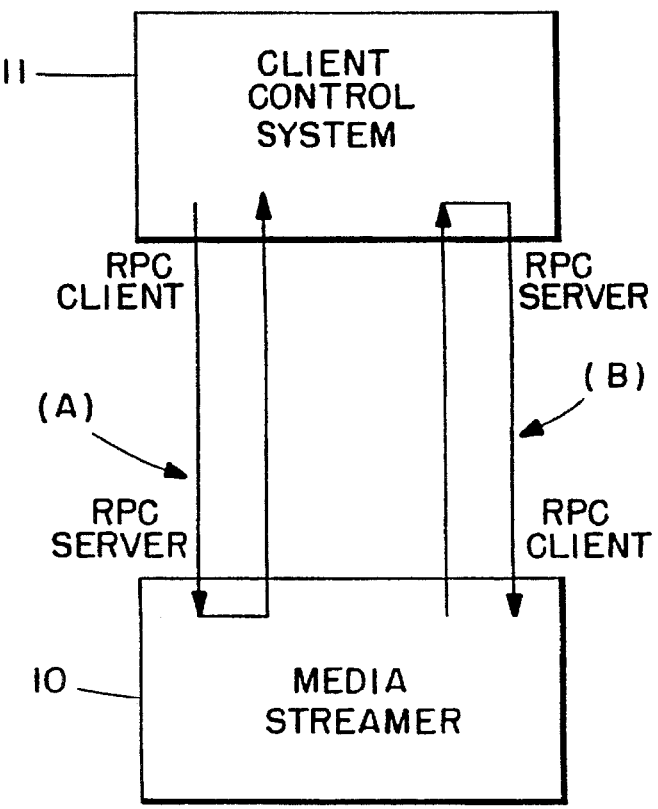
FIG. 11 illustrates several client/server relationships which exist between a client control system and the media streamer.

Communications between a client control system and the media streamer 10 is accomplished through, by example, a known type of Remote Procedure Call (RPC) facility. FIG. 11 shows the RPC structure for the communications between a client control system 11 and the media streamer 10. In calling media streamer functions, the client control system 11 functions as the RPC client and the media streamer 10 functions as the RPC server. This is indicated at (A) in FIG. 11. However, for an asynchronous function, i.e., VS-PLAY, its completion causes media streamer 10 to generate a call to the client control system 11. In this case, the client control system 11 functions as the RPC server, while media streamer 10 is the RPC client. This is indicated at (B) in FIG. 11.

D4.1. CLIENT CONTROL SYSTEM 11

In the client control system 11, the user command line interface is comprised of three internal parallel processes (threads). A first process parses a user command line input and performs the requested operation by invoking the API functions, which result in RPC calls to the media streamer 10 ((A) in FIG. 11). This process also keeps track of the status of videos being set up and played for various output ports. A second process periodically checks the elapsed playing time of each video against their specified time limit. If a video has reached its time limit, the video is stopped and disconnected and the next video in the wait queue (if any) for the same output port is started. A third process in the client control system 11 functions as an RPC server to receive the VS-PLAY asynchronous termination notification from the media streamer 10 ((B) in FIG. 11).

D4.2 MEDIA STREAMER 10

During startup of media streamer 10, two parallel processes (threads) are invoked in order to support the RPCs between the client control system(s) 11 and media streamer 10. A first process functions as an RPC server for the API function calls coming from the client control system 11 ((A) in FIG. 11). The first process receives the RPC calls and dispatches the appropriate procedures to perform the requested functions (such as VS-CONNECT, VS-PLAY, VS-DISCONNECT). A second process functions as an RPC client for calling the appropriate client control system addresses to notify the application control programs with asynchronous termination events. The process blocks itself waiting on an internal pipe, which is written by other processes that handle the playing of videos. When the latter reaches the end of a video or an abnormal termination condition, it writes a message to the pipe. The blocked process reads the message and makes an RPC call ((B) in FIG. 11 to the appropriate client control system 11 port address so that the client control system can update its status and take actions accordingly.

E. MEDIA STREAMER MEMORY ORGANIZATION AND OPTIMIZATION FOR VIDEO DELIVERY

An aspect of this invention provides integrated mechanisms for tailoring cache management and related I/O operations to the video delivery environment. This aspect of the invention is now described in detail.

E1. PRIOR ART CACHE MANAGEMENT

Prior art mechanisms for cache management are built into cache controllers and the file subsystems of operating systems. They are designed for general purpose use, and are not specialized to meet the needs of video delivery.

Figure 12:
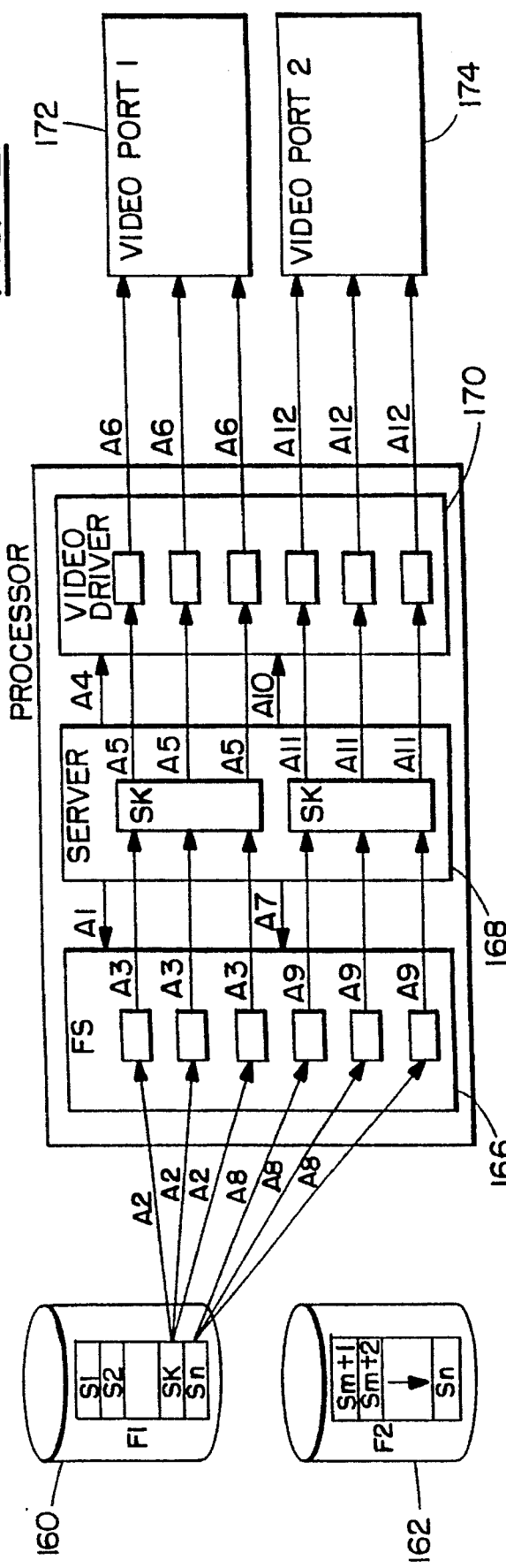
FIG. 12 illustrates a prior art technique for accessing video data and feeding it to one or more output ports.

FIG. 12 illustrates one possible way in which a conventional cache management mechanism may be configured for video delivery. This technique employs a video split between two disk files 160, 162 (because it is too large for one file), and a processor containing a file system 164, a media server 168, and a video driver 170. Also illustrated are two video adapter ports 172, 174 for two video streams. Also illustrated is the data flow to read a segment of disk file 160 into main storage, and to subsequently write the data to a first video port 172, and also the data flow to read the same segment and write it to a second video port 174. FIG. 12 is used to illustrate problems incurred by the prior art which are addressed and overcome by the media streamer 10 of this invention.

Description of steps A1–A12 in FIG. 12.

A1. Media server 168 calls file system 166 to read segment Sk into a buffer in video driver 170.

A2. File system 166 reads a part of Sk into a cache buffer in file system 166.

A3. File system 166 copies the cache buffer into a buffer in video driver 170.

Steps A2 and A3 are repeated multiple times.
A4. File system 166 calls video driver 170 to write Sk to video port 1 (176).
A5. Video driver 170 copies part of Sk to a buffer in video driver 170.
A6. Video driver 170 writes the buffer to video port 1 (176)

Steps A5 and A6 are repeated multiple times.

Steps A7–A12 function in a similar manner, except that port 1 is changed to port 2. If a part of Sk is in the cache in file system 166 when needed for port 2, then step A8 may be skipped.

As can be realized, video delivery involves massive amounts of data being transferred over multiple data streams. The overall usage pattern fits neither of the two traditional patterns used to optimize caching; random and sequential. If the random option is selected, most cache buffers will probably contain data from video segments which have been recently read, but will have no video stream in line to read them before they have expired. If the sequential option is chosen, the most recently used cache buffers are re-used first, so there is even less chance of finding the needed segment part in the file system cache. As was described previously, an important element of video delivery is that the data stream be delivered isochronously, that is without breaks and interruptions that a viewer or user would find objectionable. Prior art caching mechanisms, as just shown, cannot ensure the isochronous delivery of a video data stream to a user.

Additional problems illustrated by FIG. 12 are:

a. Disk and video port I/O is done in relatively small segments to satisfy general file system requirements. This requires more processing time, disk seek overhead, and bus overhead than would be required by video segment size segments.

b. The processing time to copy data between the file system cache buffers and media server buffers, and between media server buffers and video driver buffers, is an undesirable overhead that it would be desirable to eliminate.

c. Using two video buffers (i.e. 172, 174) to contain copies of the same video segment at the same time is an inefficient use of main memory. There is even more waste when the same data is stored in the file system cache and also in the video driver buffers.

E2. VIDEO-OPTIMIZED CACHE MANAGEMENT

There are three principal facets of the cache management operation in accordance with this aspect of the invention: sharing segment size cache buffers across streams; predictive caching; and synchronizing to optimize caching.

E2.1. SHARING SEGMENT SIZE CACHE BUFFERS ACROSS STREAMS

Videos are stored and managed in fixed size segments. The segments are sequentially numbered so that, for example, segment 5 would store a portion of a video presentation that is nearer to the beginning of the presentation than would a segment numbered 6. The segment size is chosen to optimize disk I/O, video I/O, bus usage and processor usage. A segment of a video has a fixed content, which depends only on the video name, and the segment number. All I/O to disk and to the video output, and all caching operations, are done aligned on segment boundaries.

This aspect of the invention takes two forms, depending on whether the underlying hardware supports peer-to-peer operations with data flow directly between disk and video output card in a communications node 14, without passing through cache memory in the communications node. For peer-to-peer operations, caching is done at the disk storage unit 16. For hardware which does not support peer-to-peer operations, data is read directly into page-aligned, contiguous cache memory (in a communications node 14) in segment-sized blocks to minimize I/O operations and data movement. (See F. Video Optimized Digital Memory Allocation, below).

The data remains in the same location and is written directly from this location until the video segment is no longer needed. While the video segment is cached, all video streams needing to output the video segment access the same cache buffer. Thus, a single copy of the video segment is used by many users, and the additional I/O, processor, and buffer memory usage to read additional copies of the same video segment is avoided. For peer to peer operations, half of the remaining I/O and almost all of the processor and main memory usage are avoided at the communication nodes 14.

Figure 13:
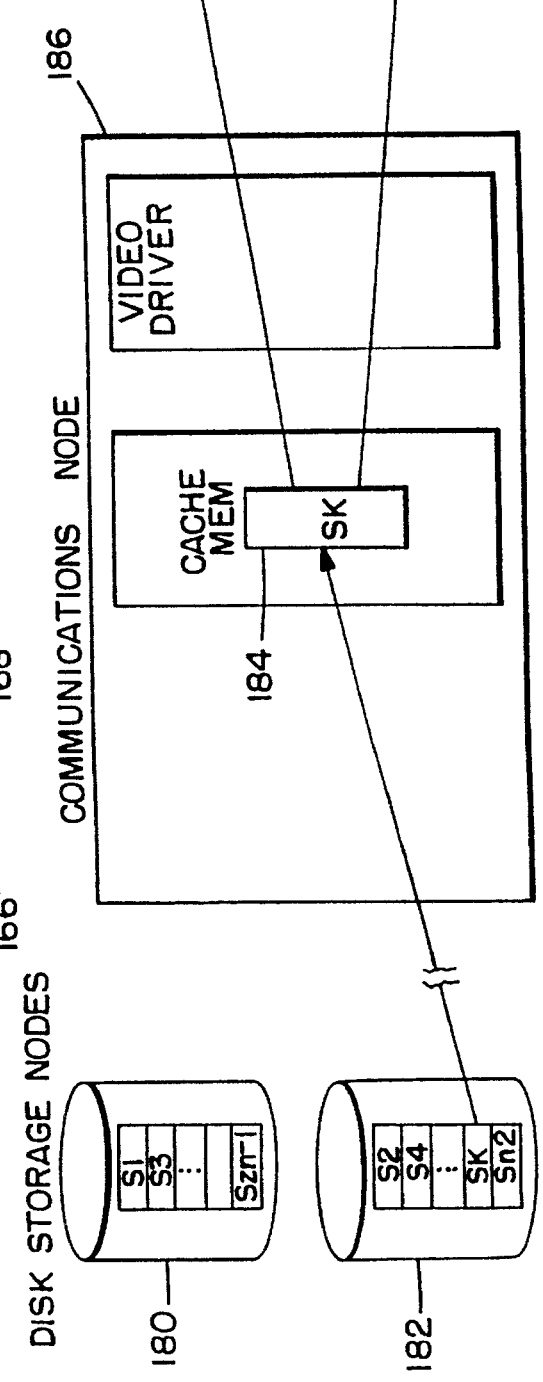
FIG. 13 is a block diagram indicating how plural video ports can access a single video segment contained in a communications node cache memory.

FIG. 13 illustrates an embodiment of the invention for the case of a system without peer-to-peer operations. The video data is striped on the disk storage nodes 16 so that odd numbered segments are on first disk storage node 180 and even numbered segments are on second disk storage node 182 (see Section H below).

The data flow for this configuration is also illustrated in FIG. 13. As can be seen, segment Sk is to be read from disk 182 into a cache buffer 184 in communication node 186, and is then to be written to video output ports 1 and 2. The SK video data segment is read directly into cache buffer 184 with one I/O operation, and is then written to port 1. Next the SK video data segment is written from cache buffer 184 to port 2 with one I/O operation.

As can be realized, all of the problems described for the conventional approach of FIG. 12 are overcome by the system illustrated in FIG. 13.

Figure 14:
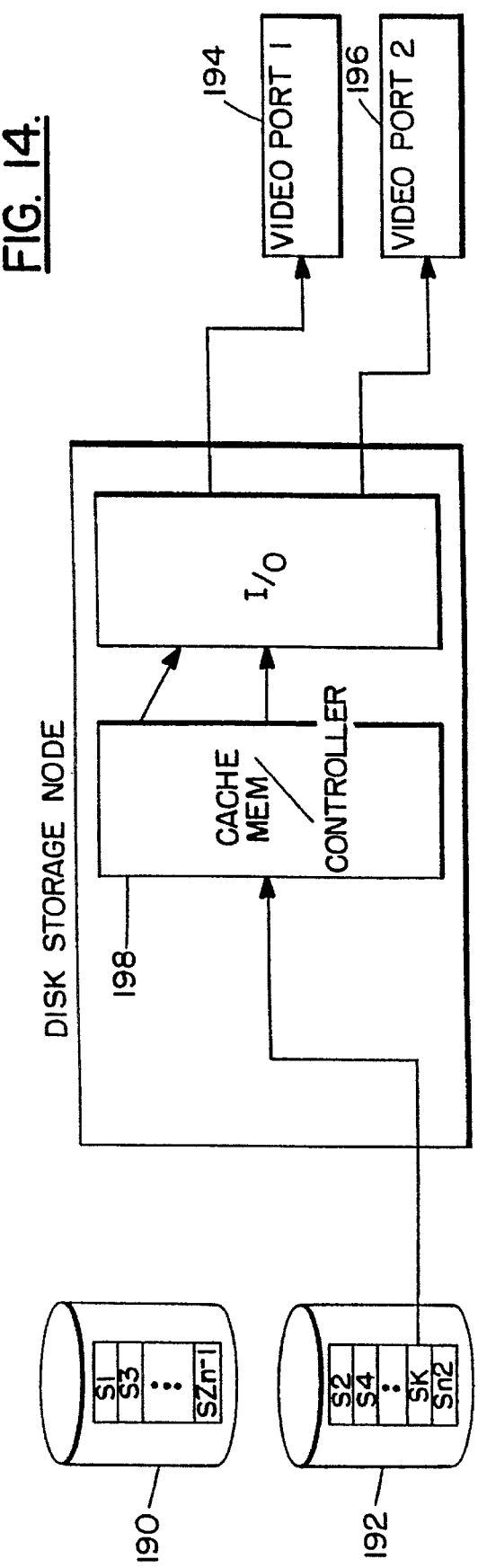
FIG. 14 is a block diagram illustrating how plural video ports have direct access to a video segment contained in cache memory on the disk storage node.

FIG. 14 illustrates the data flow for a configuration containing support for peer-to-peer operations between a disk storage node and a video output card. A pair of disk drives 190, 192 contain a striped video presentation which is fed directly to a pair of video ports 194, 196 without passing through the main memory of an intervening communication node 14.

The data flow for this configuration is to read segment Sk from disk 192 directly to port 1 (with one I/O operation) via disk cache buffer 198.

If a call follows to read segment SK to port 2, segment Sk is read directly from disk cache buffer 198 into port 2 (with one I/O operation).

When the data read into the disk cache buffer 198 for port 1 is still resident for the write to port 2, a best possible use of memory, bus, and processor resources results in the transfer of the video segment to ports 1 and 2.

It is possible to combine the peer to peer and main memory caching mechanism, e.g., using peer to peer operations for video presentations which are playing to only one port of a communication node 14, and caching in the communications node 14 for video presentations which are playing to multiple ports of the communication node 14.

A policy for dividing the caching responsibility between disk storage nodes and the communication node is chosen to maximize the number of video streams which can be supported with a given hardware configuration. If the number of streams to be supported known, then the amount and placement of caching storage can then be determined.

E2.2. PREDICTIVE CACHING

A predictive caching mechanism meets the need for a caching policy well suited to video delivery. Video presentations are in general very predictable. Typically, they start playing at the beginning, play at a fixed rate for a fairly lengthy predetermined period, and stop only when the end is reached. The caching approach of the media streamer 10 takes advantage of this predictability to optimize the set of video segments which are cached at any one time.

The predictability is used both to schedule a read operation to fill a cache buffer, and to drive the algorithm for reclaiming of cache buffers. Buffers whose contents are not predicted to be used before they would expire are reclaimed immediately, freeing the space for higher priority use. Buffers whose contents are in line for use within a reasonable time are not reclaimed, even if their last use was long ago.

More particularly, given videos v1, v2, ... , and streams s1, s2, ... playing these videos, each stream sj plays one video, v(sj), and the time predicted for writing the k-th segment of v(sj) is a linear function:

$$t(sj, k) = a(sj) + r(sj)k,$$

where a(sj) depends on the start time and starting segment number, r(sj) is the constant time it takes to play a segment, and t(sj,k) is the scheduled time to play the k-th segment of stream sj.

This information is used both to schedule a read operation to fill a cache buffer, and to drive the algorithm for re-using cache buffers. Some examples of the operation of the cache management algorithm follow:

EXAMPLE A

A cache buffer containing a video segment which is not predicted to be played by any of the currently playing video streams is re-used before re-using any buffers which are predicted to be played. After satisfying this constraint, the frequency of playing the video and the segment number are used as weights to determine a priority for keeping the video segment cached. The highest retention priority within this group is assigned to video segments that occur early in a frequently played video.

EXAMPLE B

For a cache buffer containing a video segment which is predicted to be played, the next predicted play time and the number of streams left to play the video segment are used as weights to determine the priority for keeping the video segment cached. The weights essentially allow the retention priority of a cache buffer to be set to the difference between the predicted number of I/Os (for any video segment) with the cache buffer reclaimed, and the predicted number with it retained.

For example, if v5 is playing on s7, v8 is playing on s2 and s3, with s2 running 5 seconds behind s3, and v4 is playing on streams s12 to s20 with each stream 30 seconds behind the next, then:

buffers containing v5 data already used by s7 are reclaimed first, followed by buffers containing v8 data already used by s2, followed by buffers containing v4 data already used by s12, followed by remaining buffers with the lowest retention priority.

The cache management algorithm provides variations for special cases such as connection operations (where it is possible to predict that a video segment will be played in the near future, but not exactly when) and stop operations (when previous predictions must be revised).

E2.3. SYNCHRONIZING STREAMS TO OPTIMIZE CACHING

It is desirable to cluster all streams that require a given video segment, to minimize the time that the cache buffer containing that segment must remain in storage and thus leave more of the system capacity available for other video streams. For video playing, there is usually little flexibility in the rate at which segments are played. However, in some application of video delivery the rate of playing is flexible (that is, video and audio may be accelerated or decelerated slightly without evoking adverse human reactions). Moreover, videos may be delivered for purposes other than immediate human viewing. When a variation in rate is allowed, the streams out in front (timewise) are played at the minimum allowable rate and those in back (timewise) at a maximum allowable rate in order to close the gap between the streams and reduce the time that segments must remain buffered.

The clustering of streams using a same video presentation is also taken into account during connection and play operations. For example, VS-PLAY-AT-SIGNAL can be used to start playing a video on multiple streams at the same time. This improves clustering, leaving more system resources for other video streams, enhancing the effective capacity of the system. More specifically, clustering, by delaying one stream for a short period so that it coincides in time with a second stream, enables one copy of segments in cache to be used for both streams and thus conserves processing assets.

F. VIDEO OPTIMIZED DIGITAL MEMORY ALLOCATION

Digital video data has attributes unlike those of normal data processing data in that it is non-random, that is sequential, large, and time critical rather than content critical. Multiple streams of data must be delivered at high bit rates, requiring all nonessential overhead to be minimized in the data path. Careful buffer management is required to maximize the efficiency and capacity of the media streamer 10. Memory allocation, deallocation, and access are key elements in this process, and improper usage can result in memory fragmentation, decreased efficiency, and delayed or corrupted video data.

The media streamer 10 of this invention employs a memory allocation procedure which allows high level applications to allocate and deallocate non-swappable, page aligned, contiguous memory segments (blocks) for digital video data. The procedure provides a simple, high level interface to video transmission applications and utilizes low level operating system modules and code segments to allocate memory blocks in the requested size. The memory blocks are contiguous and fixed in physical memory, eliminating the delays or corruption possible from virtual memory swapping or paging, and the complexity of having to implement gather/scatter routines in the data transmission software.

The high level interface also returns a variety of addressing mode values for the requested memory block, eliminating the need to do costly dynamic address conversion to fit the various memory models that can be operating concurrently in a media streamer environment. The physical address is available for direct access by other device drivers, such as a fixed disk device, as well as the process linear and process segmented addresses that are used by various applications. A deallocation routine is also provided that returns a memory block to the system, eliminating fragmentation problems since the memory is all returned as a single block.

F.1. COMMANDS EMPLOYED FOR MEMORY ALLOCATION

1. Allocate Physical Memory:

Allocate the requested size memory block, a control block is returned with the various memory model addresses of the memory area, along with the length of the block.

2. Deallocate Physical Memory:

Return the memory block to the operating system and free the associated memory pointers.

F2. APPLICATION PROGRAM INTERFACE

A device driver is defined in the system configuration files and is automatically initialized as the system starts. An application then opens the device driver as a pseudo device to obtain its label, then uses the interface to pass the commands and parameters. The supported commands are Allocate Memory and Deallocate Memory, the parameters are memory size and pointers to the logical memory addresses. These addresses are set by the device driver once the physical block of memory has been allocated and the physical address is converted to logical addresses. A null is returned if the allocation fails.

Figure 15:
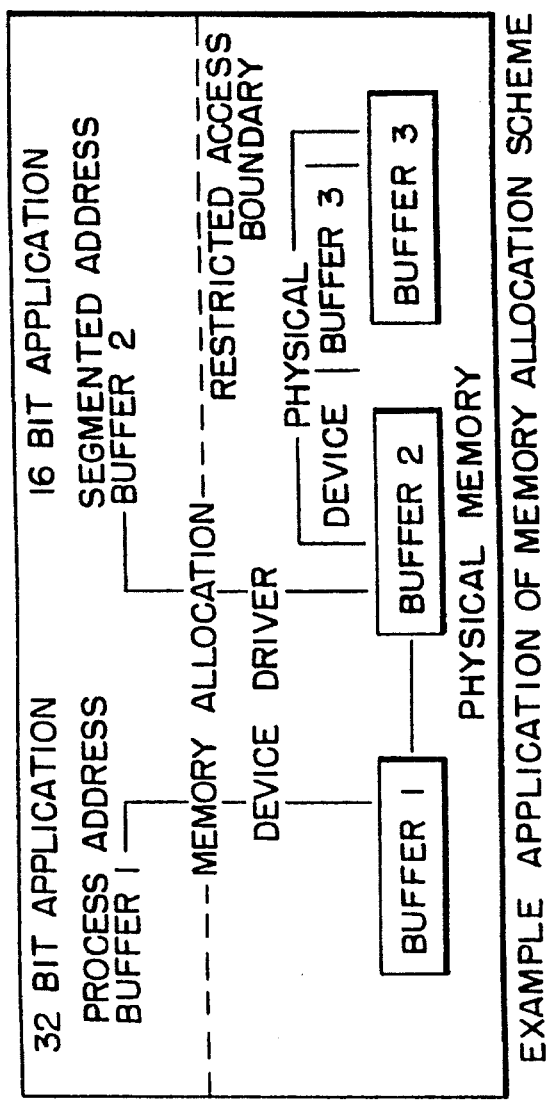
FIG. 15 illustrates a memory allocation scheme employed by the invention hereof.

FIG. 15 shows a typical set of applications that would use this procedure. Buffer 1 is requested by a 32-bit application for data that is modified and then placed into buffer 2. This buffer can then be directly manipulated by a 16 bit application using a segmented address, or by a physical device such as a fixed disk drive. By using this allocation scheme to preallocate the fixed, physical, and contiguous buffers, each application is enabled to use it's native direct addressing to access the data, eliminating the address translation and dynamic memory allocation delays. A video application may use this approach to minimize data movement by placing the digital video data in the buffer directly from the physical disk, then transferring it directly to the output device without moving it several times in the process.

G. DISK DRIVE OPTIMIZED FOR VIDEO APPLICATIONS

It is imporatant that video streams be delivered to their destination isochronously, that is without delays that can be perceived by the human eye as discontinuities in movement or by the ear as interruptions in sound. Current disk technology may involve periodic action, such as performing predictive failure analysis that may cause significant delays in data access. While most I/O operations complete within 100 ms, periodic delays of 100 ms are common and delays of three full seconds can occur.

The media streamer 10 must also be capable of efficiently sustaining high data transfer rates. A disk drive configured for general purpose data storage and retrieval will suffer inefficiencies in the use of memory, disk buffers, SCSI bus and disk capacity if not optimized for the video server application.

In accordance with an aspect of the invention, disk drives employed herewith are tailored for the role of smooth and timely delivery of large amounts of data by optimizing disk parameters. The parameters may be incorporated into the manufacture of disk drives specialized for video servers, or they may be variables that can be set through a command mechanism.

Parameters controlling periodic actions are set to minimize or eliminate delays. Parameters affecting buffer usage are set to allow for transfer of very large amounts of data in a single read or write operation. Parameters affecting speed matching between a SCSI bus and a processor bus are tuned so that data transfer starts neither too soon nor too late. The disk media itself is formatted with a sector size that maximizes effective capacity and band-width.

To accomplish optimization:

The physical disk media is formatted with a maximum allowable physical sector size. This formatting option minimizes the amount of space wasted in gaps between sectors, maximizes device capacity, and maximizes the burst data rate. A preferred implementation is 744 byte sectors.

Disks may have an associated buffer. This buffer is used for reading data from the disk media asynchronously from availability of the bus for the transfer of the data. Likewise the buffer is used to hold data arriving from the bus asynchronously from the transfer of that data to the disk media. The buffer may be divided into a number of segments and the number is controlled by a parameter. If there are too many segments, each may be too small to hold the amount of data requested in a single transfer. When the buffer is full, the device must initiate reconnection and begin transfer; if the bus/device is not available at this time, a rotational delay will ensue. In the preferred implementation, this value is set so that any buffer segment is at least as large as the data transfer size, e.g., set to one.

As a buffer segment begins to fill on a read, the disk attempts to reconnect to the bus to effect a data transfer to the host. The point in time that the disk attempts this reconnection affects the efficiency of bus utilization. The relative speeds of the bus and the disk determine the best point in time during the fill operation to begin data transfer to the host. Likewise during write operations, the buffer will fill as data arrives from the host and, at a certain point in the fill process, the disk should attempt a reconnection to the bus. Accurate speed matching results in fewer disconnect/reselect cycles on the SCSI bus with resulting higher maximum throughput.

The parameters that control when the reconnection is attempted are called "read buffer full ratio" and "write buffer empty ratio". For video data, the preferred algorithm for calculating these ratios in 256×(Instantaneous SCSI Data Transfer Rate–Sustainable Disk Data Transfer Rate)/Instantaneous SCSI Data Transfer Rate. Presently preferred values for buffer-full and buffer-empty ratios are approximately 204.

Some disk drive designs require periodic recalibration of head position with changes in temperature. Some of these disk drive types further allow control over whether thermal compensation is done for all heads in an assembly at the same time, or whether thermal compensation is done one head at a time. If all heads are done at once, delays of hundreds of milliseconds during a read operation for video data may ensue. Longer delays in read times results in the need for larger main memory buffers to smooth data flow and prevent artifacts in the multimedia presentation. The preferred approach is to program the Thermal Compensation Head Control function to allow compensation of one head at a time.

The saving of error logs and the performance of predictive failure analysis can take several seconds to complete. These delays cannot be tolerated by video server applications without very large main memory buffers to smooth over the delays and prevent artifacts in the multimedia presentation. Limit Idle Time Function parameters can be used to inhibit the saving of error logs and performing idle time functions. The preferred implementation sets a parameter to limit these functions.

H. DATA STRIPING FOR VIDEO DATA

In video applications, there is a need to deliver multiple streams from the same data (e.g., a movie). This requirement translates to a need to read data at a high data rate; that is, a data rate needed for delivering one stream multiplied by the number of streams simultaneously accessing the same data. Conventionally, this problem was generally solved by having multiple copies of the data and thus resulted in additional expense. The media streamer 10 of this invention uses a technique for serving many simultaneous streams from a single copy of the data. The technique takes into account the data rate for an individual stream and the number of streams that may be simultaneously accessing the data.

The above-mentioned data striping involves the concept of a logical file whose data is partitioned to reside in multiple file components, called stripes. Each stripe is allowed to exist on a different disk volume, thereby allowing the logical file to span multiple physical disks. The disks may be either local or remote.

Figure 16:
FIG. 16 illustrates a segmented logical file for a video 1.

When the data is written to the logical file, it is separated into logical lengths (i.e. segments) that are placed sequentially into the stripes. As depicted in FIG. 16, a logical file for a video, video 1, is segmented into M segments or blocks each of a specific size, e.g. 256 KB. The last segment may only be partially filled with data. A segment of data is placed in the first stripe, followed by a next segment that is placed in the second stripe, etc. When a segment has been written to each of the stripes, the next segment is written to the first stripe. Thus, if a file is being striped into N stripes, then stripe 1 will contain the segments 1, N+1, 2*N+1, etc., and stripe 2 will contain the segments 2, N+2, 2*N+2, etc., and so on.

A similar striping of data is known to be used in data processing RAID arrangements, where the purpose of striping is to assure data integrity in case a disk is lost. Such a RAID storage system dedicates one of N disks to the storage of parity data that is used when data recovery is required. The disk storage nodes 16 of the media streamer 10 are organized as a RAID-like structure, but parity data is not required (as a copy of the video data is available from a tape store).

Figure 17:
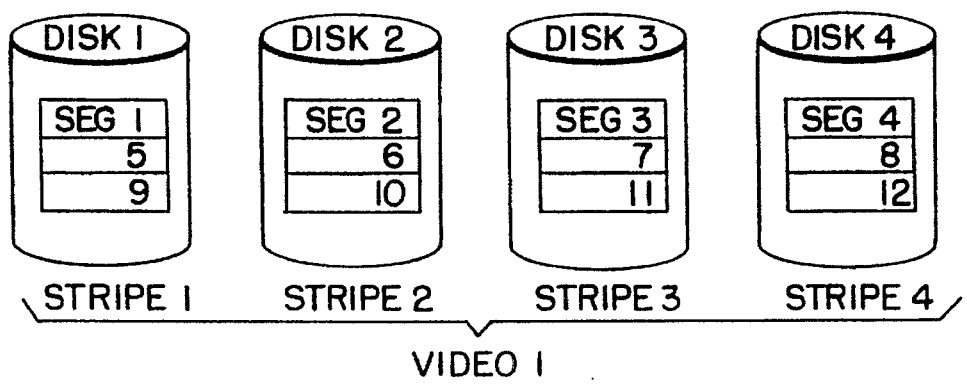
FIG. 17 illustrates how the various segments of video 1 are striped across a plurality of disk drives.

FIG. 17 illustrates a first important aspect of this data arrangement, i.e., the separation of each video presentation into data blocks or segments that are spread across the available disk drives to enable each video presentation to be accessed simultaneously from multiple drives without requiring multiple copies. Thus, the concept is one of striping, not for data integrity reasons or performance reasons, per se, but for concurrency or bandwidth reasons. Thus, the media stream 10 stripes video presentation by play segments, rather than by byte block, etc.

As is shown in FIG. 17, where a video data file 1 is segmented into M segments and split into four stripes, stripe 1 is a file containing segments 1, 5, 9, etc. of video file 1; stripe 2 is a file containing segments 2, 6, 10, etc., of video file 1, stripe 3 is a file containing segments 3, 7, 11, etc. of the video file and stripe 4 is a file containing the segments 4, 8, 12, etc., of video file 1, until all M segments of video file 1 are contained in one of the four stripe files.

Given the described striping strategy, parameters are computed as follows to customize the striping of each individual video.

First, the segment size is selected so as to obtain a reasonably effective data rate from the disk. However, it cannot be so large as to adversely affect the latency. Further it should be small enough to buffer/cache in memory. A preferred segment size is 256 KB, and is constant for video presentations of data rates in ranges from 128 KB/sec. to 512 KB/sec. If the video data rate is higher, then it may be preferable to use a larger segment size. The segment size depends on the basic unit of I/O operation for the range of video presentations stored on the same media. The principle employed is to use a segment size that contains approximately 0.5 to 2 seconds of video data.

Next, the number of stripes, i.e. the number of disks over which video data is distributed, is determined. This number must be large enough to sustain the total data rate required and is computed individually for each video, presentation based on an anticipated usage rate. More specifically, each disk has a logical volume associated with it. Each video presentation is divided into component files, as many components as the number of stripes needed. Each component file is stored on a different logical volume. For example, if video data has to be delivered at 250 KB/sec per stream and 30 simultaneous streams are supported from the same video, started at say 15 second intervals, a total data rate of at least 7.5 MB/sec is obtained. If a disk drive can support on the average 3 MB/sec., at least 3 stripes are required for the video presentation.

The effective rate at which data can be read from a disk is influenced by the size of the read operation. For example, if data is read from the disk in 4 KB blocks (from random positions on the disk), the effective data rate may be 1 MB/sec. whereas if the data is read in 256 KB blocks the rate may be 3 MB/sec. However, if data is read in very large blocks, the memory required for buffers also increases and the latency, the delay in using the data read, also increases because the operation has to complete before the data can be accessed. Hence there is a trade-off in selecting a size for data transfer. A size is selected based on the characteristics of the devices and the memory configuration. Preferably, the size of the data transfer is the selected segment size. For a given segment size the effective data rate from a device is determined. For example, for some disk drives, a 256 KB segment size provides a good balance for the effective use of the disk drives (effective data rate of 3 MB/sec.) and buffer size (256 KB).

If striping is not used, the maximum number of streams that can be supported is limited by the effective data rate of the disk, e.g. if the effective data rate is 3 MB/s and a stream data rate is 200 KB/s, then no more than 15 streams can be supplied from the disk. If, for instance, 60 streams of the same video are needed then the data has to be duplicated on 4 disks. However, if striping is used in accordance with this invention, 4 disks of ¼ the capacity can be used. Fifteen streams can be simultaneously played from each of the 4 stripes for a total of 60 simultaneous streams from a single copy of the video data. The start times of the streams are skewed to ensure that the requests for the 60 streams are evenly spaced among the stripes. Note also that if the streams are started close to each other, the need for I/O can be reduced by using video data that is cached.

The number of stripes for a given video is influenced by two factors, the first is the maximum number of streams that are to be supplied at any time from the video and the other is the total number of streams that need to be supplied at any time from all the videos stored on the same disks as the video.

The number of stripes (s) for a video is determined as follows:

$$s = \text{maximum } (r*n/d, r*m/d),$$

where:

r=nominal data rate at which the stream is to be played;

n=maximum number of simultaneous streams from this video presentation at the nominal rate;

d=effective data rate from a disk (Note that the effective data rate from disk is influenced by the segment size);

m=maximum number of simultaneous streams at nominal rate from all disks that contains any part of this video presentation; and s=number of stripes for a video presentation.

The number of disks over which data for a video presentation is striped are managed as a set, and can be thought of as a very large physical disk. Striping allows a video file to exceed the size limit of the largest file that a system's physical file system will allow. The video data, in general, will not always require the same amount of storage on all the disks in the set. To balance the usage of the disk, when a video is striped, the striping is begun from the disk that has the most free space.

As an example, consider the case of a video presentation that needs to be played at 2 mbits/sec. (250,000 bytes/sec.), i.e., r is equal to 250,000 bytes/sec., and assume that it is necessary to deliver up to 30 simultaneous streams from this video, i.e., n is 30. Assume in this example, that m is also 30, i.e., the total number of streams to be delivered from all disks is also 30. Further, assume that the data is striped in segments of 250,000 bytes and that the effective data rate from a disk for the given segment size (250,000 bytes) is 3,000,000 bytes/sec. Then n, the number of stripes needed, is (250,000*30/3,000,000) 2.5 which is rounded up to 3 (s=ceiling(r*n/d)).

If the maximum number of streams from all disks that contain this data is, for instance 45, then 250,000*45/3,000,000 or 3.75 stripes and needed, which is rounded up to 4 stripes.

Even though striping the video into 3 stripes is sufficient to meet the requirement for delivering the 30 streams from the single copy of the video, if disks containing the video also contain other content, and the total number of streams from that video to be supported is 45, then four disk drives are needed (striping level of 4).

The manner in which the algorithm is used in the media streamer 10 is as follows. The storage (number of disk drives) is divided into groups of disks. Each group has a certain capacity and capability to deliver a given number of simultaneous streams (at an effective data rate per disk based on a predetermined segment size). The segment size for each group is constant. Different groups may choose different segments sizes (and hence have different effective data rates). When a video presentation is to be striped, a group is first chosen by the following criteria.

The segment size is consistent with the data rate of the video, i.e., if the stream data rate is 250,000 bytes/sec., the segment size is in the range of 125K to 500 KB. The next criteria is to ensure that the number of disks in the group are sufficient to support the maximum number of simultaneous streams, i.e., the number of disks where "r" is the stream data rate and "n" the maximum number of simultaneous streams, and "d" the effective data rate of a disk in the group. Finally, it should be insured that the sum total of simultaneous streams that need to be supported from all of the videos in the disk group does not exceed its capacity. That is, if "m" is the capacity of the group, the "m–n" should be greater than or equal to the sum of all the streams that can be played simultaneously from the videos already stored in the group.

The calculation is done in control node 18 at the time the video data is loaded into the media streamer 10. In the simplest case all disks will be in a single pool which defines the total capacity of the media streamer 10, both for storage and the number of supportable streams. In this case the number of disks (or stripes) necessary to support a given number of simultaneous streams is calculated from the formula m*r/d, where m is the number of streams, r is the data rate for a stream, and d is the effective data rate for a disk. Note that if the streams can be of different rates, then m*r, in the above formula, should be replaced by: Max (sum of the data rates of all simultaneous streams).

The result of using this technique for writing the data is that the data can be read for delivering many streams at a specified rate without the need for multiple copies of the digital representation of the video presentation. By striping the data across multiple disk volumes the reading of one part of the file for delivering one stream does not interfere with the reading of another part of the file for delivering another stream.

I. MEDIA STREAMER DATA TRANSFERS AND CONVERSION PROCEDURES 1.1. DYNAMIC BANDWIDTH ALLOCATION FOR VIDEO DELIVERY TO THE SWITCH 18

Conventionally video servers generally fit one of two profiles. Either they use PC technology to build a low cost (but also low bandwidth) video server or they use super-computing technology to build a high bandwidth (also expensive) video server. A object of this invention then is to deliver high bandwidth video, but without the high cost of super-computer technology.

A preferred approach to achieving high bandwidth at low cost is to use the low latency switch (crossbar circuit switch matrix) 18 to interconnect low cost PC based "nodes" into a video server (as shown in FIG. 1). An important aspect of the media streamer architecture is efficient use of the video stream bandwidth that is available in each of the storage nodes 16 and communication nodes 14. The bandwidth is maximized by combining the special nature of video data (write once, read many times) with the dynamic, real time bandwidth allocation capability of a low-cost switch technology.

Figure 18:
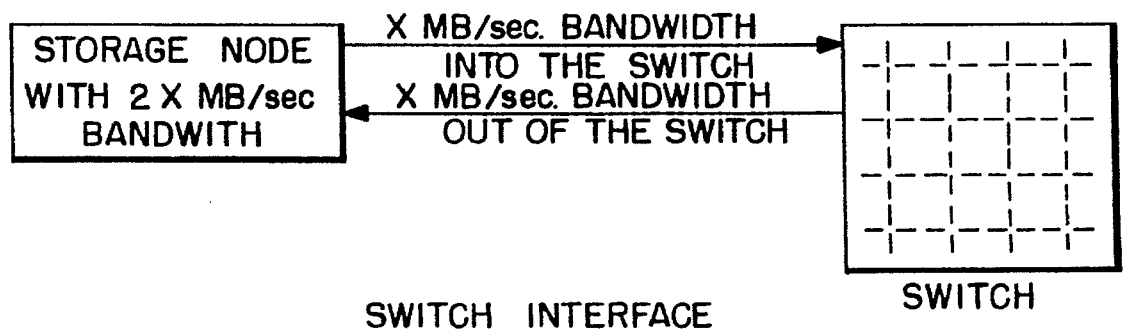
FIG. 18 illustrates a prior art switch interface between a storage node and a cross bar switch.

FIG. 18 shows a conventional logical connection between a switch interface and a storage node. The switch interface must be full duplex (i.e., information can be sent in either direction simultaneously) to allow the transfer of video (and control information) both into and out of the storage node. Because video content is written to the storage node once and then read many times, most of the bandwidth requirements for the storage node are in the direction towards the switch. In the case of a typical switch interface, the bandwidth of the storage node is under-utilized because that half of the bandwidth devoted to write capability is so infrequently used.

Figure 19:
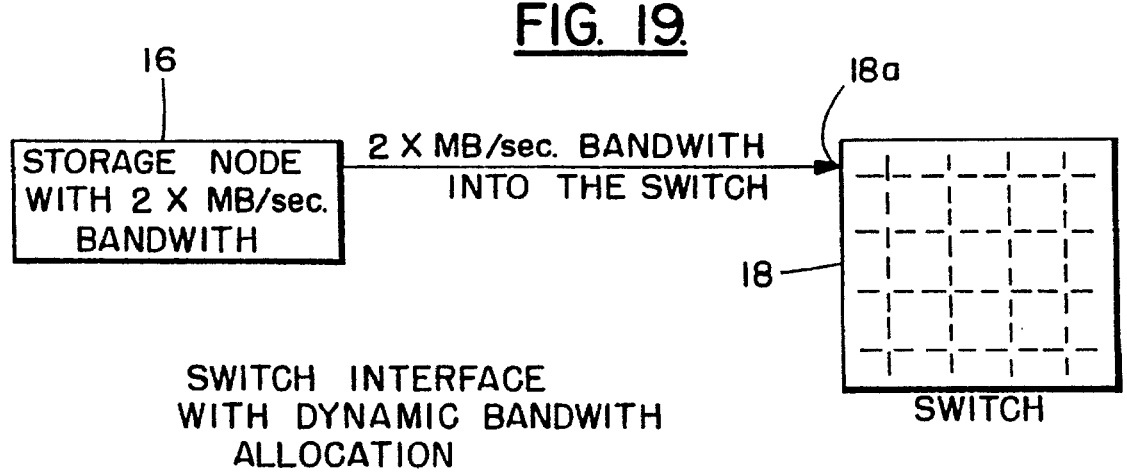
FIG. 19 illustrates how the prior art switch interface shown in FIG. 18 is modified to provide extended output bandwidth for a storage node.

FIG. 19 shows a switch interface in accordance with this invention. This interface dynamically allocates its total bandwidth in real time either into or out of the switch 18 to meet the current demands of the node. (The storage node 16 is used as an example.) The communication nodes 14 have similar requirements, but most of their bandwidth is in the direction from the switch 18.

The dynamic allocation is achieved by grouping two or more of the physical switch interfaces, using appropriate routing headers for the switch 12, into one logical switch interface 18a. The video data (on a read, for example) is then split between the two physical interfaces. This is facilitated by striping the data across multiple storage units as described previously. The receiving node combines the video data back into a single logical stream.

As an example, in FIG. 18 the switch interface is rated at 2× MB/sec. full duplex i.e., × MB/sec. in each direction. But video data is usually sent only in one direction (from the storage node into the switch). Therefore only × MB/sec. of video bandwidth is delivered from the storage node, even though the node has twice that capability (2×). The storage node is under utilized. The switch interface of FIG. 19 dynamically allocates the entire 2× MB/sec. bandwidth to transmitting video from the storage node into the switch. The result is increased bandwidth from the node, higher bandwidth from the video server, and a lower cost per video stream.

J. ISOCHRONOUS VIDEO DATA DELIVERY USING COMMUNICATIONS ADAPTERS

Digital video data is sequential, continuous, large, and time critical, rather than content critical. Streams of video data must be delivered isochronously at high bit rates, requiring all nonessential overhead to be minimized in the data path. Typically, the receiving hardware is a video set top box or some other suitable video data receiver. Standard serial communication protocols insert additional bits and bytes of data into the stream for synchronization and data verification, often at the hardware level. This corrupts the video data stream if the receiver is not able to transparently remove the additional data. The additional overhead introduced by these bits and bytes also decreases the effective data rate which creates video decompression and conversion errors.

Figure 20:
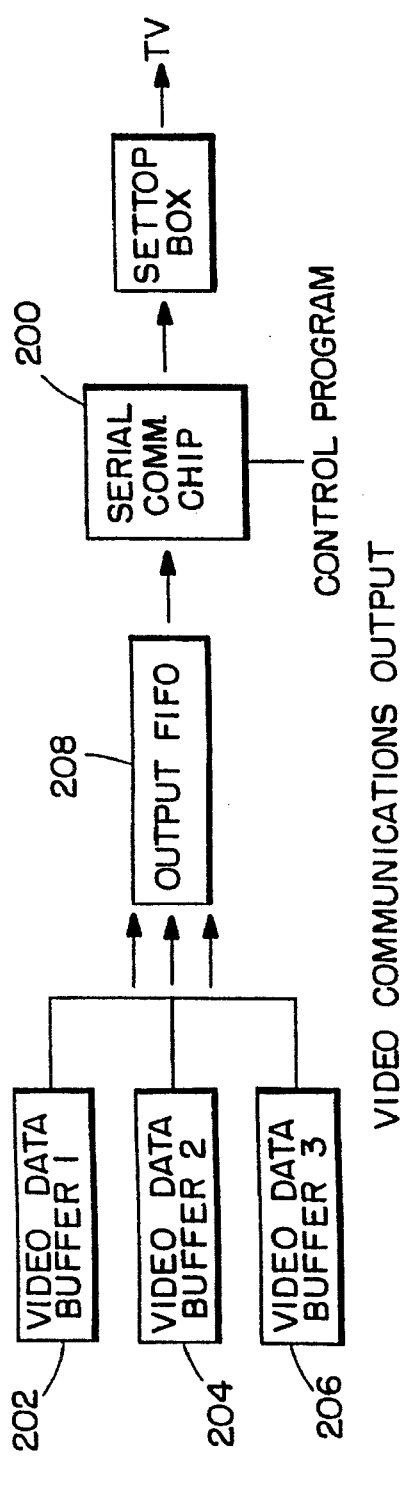
FIG. 20 is a block diagram illustrating a procedure for assuring constant video output to a video output bus.

It has been determined that the transmission of video data over standard communications adapters, to ensure isochronous delivery to a user, requires disabling most of the standard serial communications protocol attributes. The methods for achieving this vary depending on the communications adapters used, but the following describes the underlying concepts. In FIG. 20, a serial communications chip 200 in a communications node 14 disables data formatting and integrity information, such as the parity, start and stop bits, cyclic redundancy check codes and sync bytes, and prevents idle characters from being generated. Input FIFO buffers 202, 204, 206, etc. are employed to insure a constant (isochronous) output video data stream while allowing bus cycles for loading of the data blocks. A 1000 byte FIFO buffer 208 simplifies the CPU and bus loading logic.

If communications output chip 200 does not allow the disabling of an initial synchronization (sync) byte generation, then the value of the sync byte is programmed to the value of the first byte of each data block (and the data block pointer is incremented to the second byte). Byte alignment must also be managed with real data, since any padding bytes will corrupt the data stream if they are not part of the actual compressed video data.

To achieve the constant, high speed serial data outputs required for the high quality levels of compressed video data, either a circular buffer or a plurality of large buffers (e.g. 202, 204, 206) must be used. This is necessary to allow sufficient time to fill an input buffer while outputting data from a previously filled buffer. Unless buffer packing is done earlier in the video data stream path, the end of video condition can result in a very small buffer that will be output before the next buffer transfer can complete resulting in a data underrun. This necessitates a minimum of three large, independent buffers. A circular buffer in dual mode memory (writable while reading) is also a suitable embodiment.

J1. CONVERSION OF VIDEO IMAGES AND MOVIES FROM COMPRESSED MPEG-1, 1+, OR MPEG-2, DIGITAL DATA FORMAT INTO INDUSTRY STANDARD TELEVISIONS FORMATS (NTSC OR PAL)

As described above, digital video data is moved from disk to buffer memory. Once enough data is in buffer memory, it is moved from memory to an interface adapter in a communications node 14. The interfaces used are the SCSI 20 MB/sec., fast/wide interface or the SSA serial SCSI interface. The SCSI interface is expanded to handle 15 addresses and the SSA architecture supports up to 256. Other suitable interfaces include, but are not limited to, RS422, V.35, V.36, etc.

Figure 21:
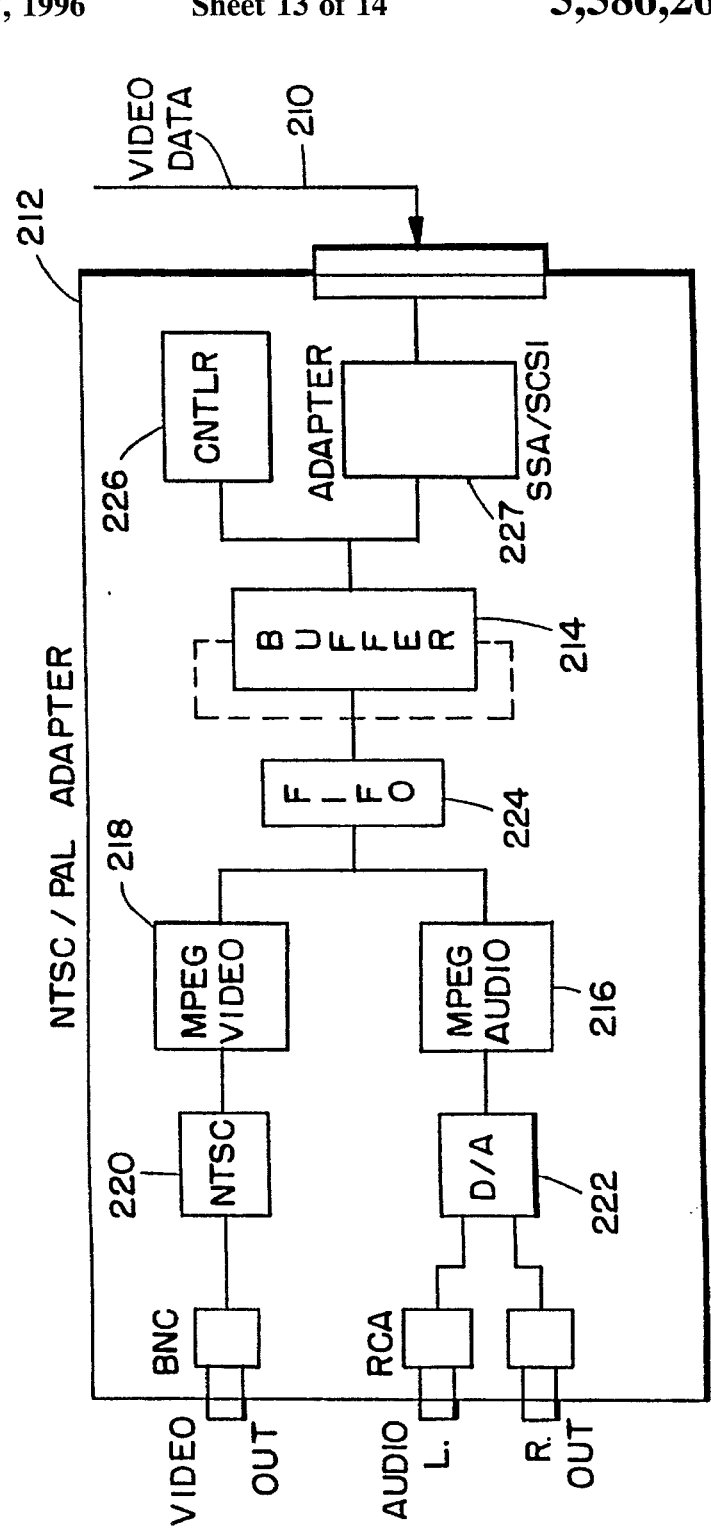
FIG. 21 illustrates a block diagram of a video adapter used in converting digital video data to analog video data.

As shown in FIG. 21, video data from the interface is passed from a communication node 14 across a communications bus 210 to NTSC adapter 212 (see also FIG. 20) where the data is buffered. Adapter 212 pulls the data from a local buffer 214, where multiple blocks of data are stored to maximize the performance of the bus. The key goal of adapter 212 is to maintain an isochronous flow of data from the memory 214 to MPEG chips 216, 218 and thus to NTSC chip 220 and D/A 222, to insure that there are no interruptions in the delivery of video and/or audio.

MPEG logic modules 216, 218 convert the digital (compressed) video data into component level video and audio. An NTSC encoder 220 converts the signal into NTSC baseband analog signals. MPEG audio decoder 216 converts the digital audio into parallel digital data which is then passed through a Digital to Analog converter 222 and filtered to generate audio Left and Right outputs.

The goal in creating a solution to the speed matching and Isochronous delivery problem is an approach that not only maximizes the bandwidth delivery of the system but also imposes the fewest performance constraints.

Typically, application developers have used a bus structure, such as SSA and SCSI, for control and delivery of data between processors and mechanical storage devices such disk files, tape files, optical storage units, etc. Both of these buses contain attributes that make them suitable for high bandwidth delivery of video data, provided that means are taken to control the speed and isochronous delivery of video data.

The SCSI bus allows for the bursting of data at 20 Mbytes/sec. which minimizes the amount of time that any one video signal is being moved from buffer memory to a specific NTSC adapter. The adapter card 212 contains a large buffer 214 with a performance capability to burst data into memory from bus 210 at high peak rates and to remove data from buffer 214 at much lower rates for delivery to NTSC decoder chips 216, 218. Buffer 214 is further segmented into smaller buffers and connected via software controls to act as multiple buffers connected in a circular manner.

This allows the system to deliver varying block sizes of data to separate buffers and controls the sequence of playout. An advantage of this approach is that it frees the system software to deliver blocks of video data well in advance of any requirement for the video data, and at very high delivery rates. This provides the media streamer 10 with the ability to manage many multiple video steams on a dynamic throughput requirement. When a processor in a communications node has time, it can cause delivery of several large blocks of data that will be played in sequence. Once this is done, the processor is free to control other streams without an immediate need to deliver slow continuous isochronous data to each port.

To further improve the cost effectiveness of the decoder system, a small FIFO memory 224 is inserted between the larger decoder buffer 214 and MPEG decoders 216, 218. The FIFO memory 224 allows controller 226 to move smaller blocks, typically 512 bytes of data, from buffer 214 to FIFO 224 which, in turn, converts the data into serial bit streams for delivery to MPEG decoders 216, 218. Both the audio and the video decoder chips 216, 218 can take their input from the same serial data stream, and internally separate and decode the data required. The transmission of data from the output of the FIFO memory 224 occurs in an isochronous manner, or substantially isochronous manner, to ensure the delivery of an uninterrupted video presentation to a user or consumer of the video presentation.

K. TRANSMISSION OF DIGITAL VIDEO TO SCSI DEVICES

Figure 22:
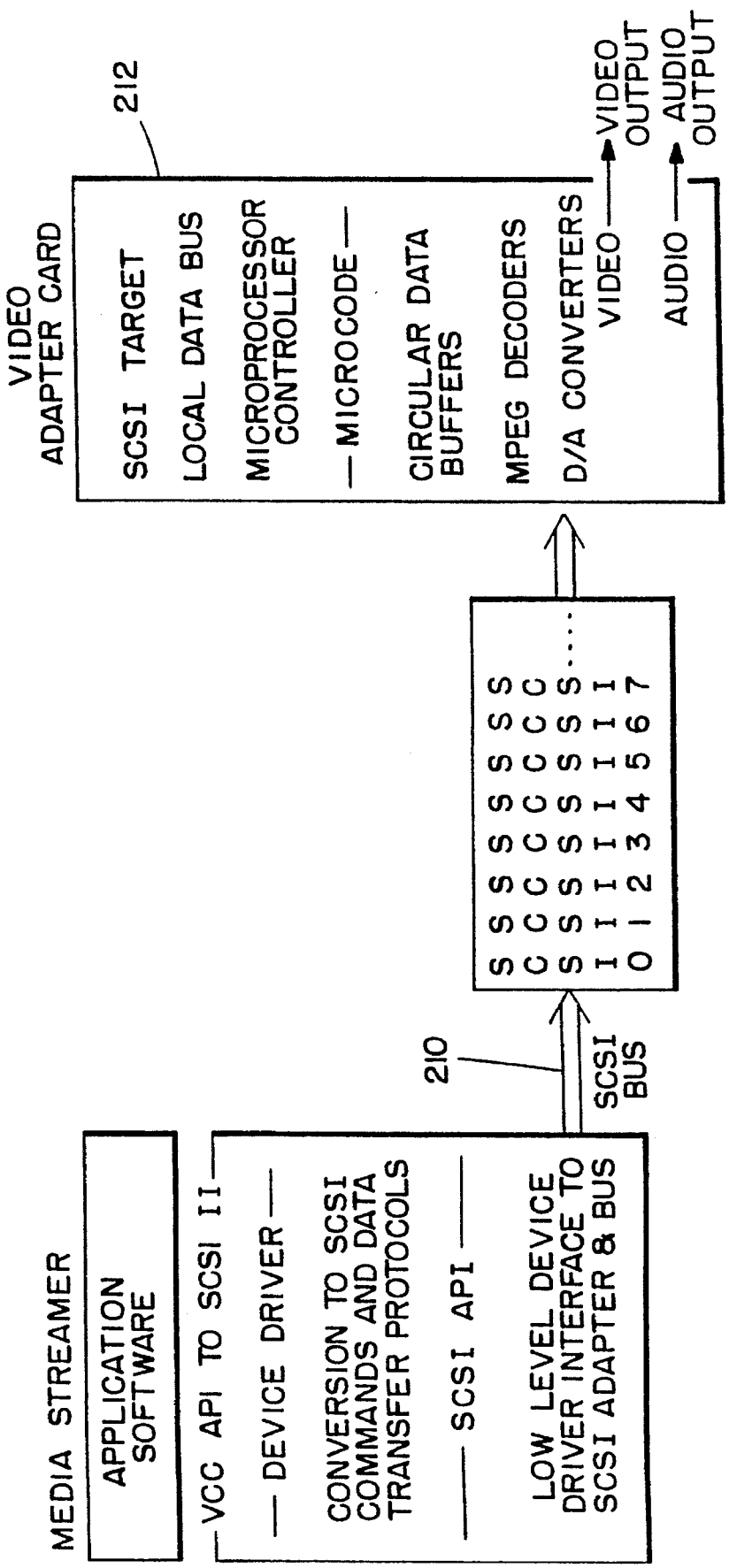
FIG. 22 is a block diagram showing control modules that enable SCSI bus commands to be employed to control the video adapter card of FIG. 21.

As shown in FIG. 22, compressed digital video data and command streams from buffer memory are converted by device level software into SCSI commands and data streams, and are transmitted over SCSI bus 210 to a target adapter 212 at SCSI II fast data rates. The data is then buffered and fed at the required content output rate to MPEG logic for decompression and conversion to analog video and audio data. Feedback is provided across SCSI bus 210 to pace the data flow and insure proper buffer management.

The SCSI NTSC/PAL adapter 212 provides a high level interface to SCSI bus 210, supporting a subset of the standard SCSI protocol. The normal mode of operation is to open the adapter 212, write data (video and audio) streams to it and, closing the adapter 212 only when completed. Adapter 212 pulls data as fast as necessary to keep its buffers full, with the communication nodes 14 and storage nodes 16 providing blocks of data, that are sized to optimize the bus data transfer and minimize bus overhead.

System parameters can be overwritten via control packets using a Mode Select SCSI command if necessary. Video/Audio synchronization is internal to the adapter 212 and no external controls are required. Errors are minimized, with automatic resynchronization and continued audio/video output.

K1. SCSI LEVEL COMMAND DESCRIPTION

A mix of direct access device and sequential device commands are used as well as standard common commands to fit the functionality of the SCSI video output adapter. As with all SCSI commands, a valid status byte is returned after every command, and the sense data area is loaded with the error conditions if a check condition is returned. The standard SCSI commands used include RESET, INQUIRY, REQUEST SENSE, MODE SELECT, MODE SENSE, READ, WRITE, RESERVE, RELEASE, TEST UNIT READY.

Video Commands:

The video control commands are user-level video output control commands, and are extensions to the standard commands listed above. They provide a simplified user level front end to the low level operating system or SCSI commands that directly interface to the SCSI video output adapter 212. The implementation of each command employs microcode to emulate the necessary video device function and avoid video and audio anomalies caused by invalid control states. A single SCSI command; the SCSI START/STOP UNIT command, is used to translate video control commands to the target SCSI video output adapter 212, with any necessary parameters moved along with the command. This simplifies both the user application interface and the adapter card 212 microcode. The following commands are employed.

Stop (SCSI START/STOP 1—parameter=mode)

The data input into the MPEG chip set (216, 218) is halted, the audio is muted, and the video is blanked. The parameter field selects the stop mode. The normal mode is for the buffer and position pointer to remain current, so that PLAY continues at the same location in the video stream. A second (end of movie or abort) mode is to set the buffer pointers to the start of the next buffer and release the current buffer. A third mode is also for end of movie conditions, but the stop (mute and blank) is delayed until the data buffer runs empty. A fourth mode may be employed with certain MPEG decoder implementations to provide for a delayed stop with audio, but freeze frame for the last valid frame when the data runs out. In each of these cases, the video adapter 212 microcode determines the stopping point so that the video and audio output is halted on the proper boundary to allow a clean restart.

Pause (SCSI START/STOP 2—no parameters)

The data input into the MPEG chip set (216, 218) is halted and the audio is muted, but the video is not blanked. This causes the MPEG video chip set (216, 218) to hold a freeze frame of the last good frame. This is limited to avoid burn-in of the video tube. A Stop command is preferably issued by the control node 18 but the video output will automatically go to blank if no commands are received within 5 minutes. The adapter 212 microcode maintains the buffer positions and decoder states to allow for a smooth transition back to play.

Blank-Mute (SCSI START/STOP 3—parameter=mode)

This command blanks the video output without impacting the audio output, mutes the audio output without impacting the video, or both. Both muting and blanking can be turned off with a single command using a Mode parameter, which allows a smoother transition and reduced command overhead. These are implemented on the video adapter 212 after decompression and conversion to analog, with hardware controls to ensure a positive, smooth transition.

Slow Play (SCSI START/STOP 4—parameter=rate)

This command slows the data input rate into the MPEG chip set, (216, 218) causing it to intermittently freeze frame, simulating a slow play function on a VCR. The audio is muted to avoid digital error noise. The parameter field specifies a relative speed from 0 to 100. An alternative implementation disables the decoder chip set (216, 218) error handling, and then modifies the data clocking speed into the decoder chip set to the desired playing speed. This is dependent on the flexibility of the video adapter's clock architecture.

Play (SCSI START/STOP 5—parameter=buffer)

This command starts the data feed process into the MPEG chip set (216, 218), enabling the audio and video outputs. A buffer selection number is passed to determine which buffer to begin the playing sequence from, and a zero value indicates that the current play buffer should be used (typical operation). A non-zero value is only accepted if the adapter 212 is in STOPPED mode, if in PAUSED mode the buffer selection parameter is ignored and playing is resumed using the current buffer selection and position.

When 'PLAYING', the controller 226 rotates through the buffers sequentially maintaining a steady stream of data into the MPEG chip set (216, 218). Data is read from the buffer at the appropriate rate into the MPEG bus starting at address zero until N bytes are read, then the controller 226 switches to the next buffer and continues reading data. The adapter bus and microcode provides sufficient bandwidth for both the SCSI Fast data transfer into the adapter buffers 214, and the steady loading of the data onto the output FIFO 224 that feeds the MPEG decompression chips (216, 218).

Fast Forward (SCSI START/STOP 6—parameter=rate)

This command is used to scan through data in a manner that emulates fast forward on a VCR. There are two modes of operation that are determined by the rate parameter. A rate of 0 means that it is a rapid fast forward where the video and audio should be blanked and muted, the buffers flushed, and an implicit play is executed when data is received from a new position forward in the video stream.

An integer value between 1 and 10 indicates the rate that the input stream is being forwarded. The video is 'sampled' by skipping over blocks of data to achieve the specified average data rate. The adapter 212 plays a portion of data at nearly the normal rate, jumps ahead, then plays the next portion to emulate the fast forward action.

Rewind (SCSI START/STOP 7—parameter=buffer)

This command is used to scan backwards through data in a manner that emulates rewind on a VCR. There are two modes of operation that are determined by the rate parameter. A rate of 0 means that it is a rapid rewind where the video and audio should be blanked and muted, the buffers flushed, and an implicit play executed when data is received from a new position forward in the video stream. An integer value between 1 and 10 indicates the rate that the input stream is being rewound. The video is 'sampled' by skipping over blocks of data to achieve the specified average data rate. The rewind data stream is built by assembling small blocks of data that are 'sampled' from progressively early positions in the video stream. The adapter card 212 smoothly handles the transitions and synchronization to play at the normal rate, skipping back to the next sampled portion to emulate rewind scanning.

K2. BUFFER MANAGEMENT

Digital video servers provide data to many concurrent output devices, but digital video data decompression and conversion requires a constant data stream. Data buffering techniques are used to take advantage of the SCSI data burst mode transmission, while still avoiding data underrun or buffer overrun, allowing media streamer 10 to transmit data to many streams with minimal intervention. SCSI video adapter card 212 (FIGS. 21, 22) includes a large buffer 214 for video data to allow full utilization of the SCSI burst mode data transfer process. An exemplary configuration would be one buffer 214 of 768K, handled by local logic as a wrap-around circular buffer. Circular buffers are preferred to dynamically handle varying data block sizes, rather than fixed length buffers that are inefficient in terms of both storage and management overhead when transferring digital video data.

The video adapter card 212 microcode supports several buffer pointers, keeping the last top of data as well as the current length and top of data. This allows a retry to overwrite failed transmission, or a pointer to be positioned to a byte position within the current buffer if necessary. The data block length is maintained exactly as transmitted (e.g., byte or word specific even if long word alignment is used by the intermediate logic) to insure valid data delivery to the decode chip set (216, 218). This approach minimizes the steady state operation overhead, while still allowing flexible control of the data buffers.

K2.1. BUFFER SELECTION AND POSITION

Assuming multiple sets of buffers are required, multiple pointers are available for all buffer related operations. For example, one set may be used to select the PLAY buffer and current position within that buffer, and a second set to select the write buffer and a position within that buffer (typically zero) for a data preload operation. A current length and maximum length value are maintained for each block of data received since variable length data blocks are also supported.

K2.2. AUTOMATIC MODE

The buffer operation is managed by the video adapter's controller 226, placing the N bytes of data in the next available buffer space starting at address zero of that buffer. Controller 226 keeps track of the length of data in each buffer and if that data has been "played" or not. Whenever sufficient buffer space is free, the card accepts the next WRITE command and DMA's the data into that buffer. If not enough buffer space is free to accept the full data block (typically a Slow Play or Pause condition), the WRITE is not accepted and a buffer full return code is returned.

K2.3. MANUAL MODE

A LOCATE command is used to select a 'current' write buffer and position within that buffer (typically zero) for each buffer access command (Write, Erase, etc.). The buffer position is relative to the start of data for the last block of data that was successfully transmitted. This is done preferably for video stream transition management, with the automatic mode reactivated as soon as possible to minimize command overhead in the system.

K2.4. ERROR MANAGEMENT

Digital video data transmission has different error management requirements than the random data access usage that SCSI is normally used for in data processing applications. Minor data loss is less critical than transmission interruption, so the conventional retries and data validation schemes are modified or disabled. The normal SCSI error handling procedures are followed with the status byte being returned during the status phase at the completion of each command. The status byte indicates either a GOOD (00) condition, a BUSY (8 h) if the target SCSI chip 227 is unable to accept a command, or a CHECK CONDITION (02 h) if an error has occurred.

K2.5. ERROR RECOVERY

The controller 226 of the SCSI video adapter 212 automatically generates a Request Sense command on a Check Condition response to load the error and status information, and determines if a recovery procedure is possible. The normal recovery procedure is to clear the error state, discard any corrupted data, and resume normal play as quickly as possible. In a worst case, the adapter 212 may have to be reset and the data reloaded before the play can resume. Error conditions are logged and reported back to the host system with the next INQUIRY or REQUEST SENSE SCSI operation.

K2.6. AUTOMATIC RETRIES For buffer full or device busy conditions, retries are automated up to × number of retries, where × is dependent on the stream data rate. This is allowed only to the point in time that the next data buffer arrives. At that point, an error is logged if the condition is unexpected (i.e., Buffer full but not PAUSED or in SLOW PLAY mode) and a device reset or clear may be necessary to recover and continue video play.

Although described primarily in the context of delivering a video presentation to a user, it should be realized that bidirectional video adapters can be employed to receive a video presentation, to digitize the video presentation as a data representation thereof, and to transmit the data representation over the bus 210 to a communication node 14 for storage, via low latency switch 18, within a storage node or nodes 16, 17 as specified by the control node 18.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A media streamer, comprising:
   at least one storage node for storing a digital representation of at least one video presentation, said at least one video presentation requiring a time T to present in its entirety, and stored as a plurality of N data blocks, each data block comprising a T/N portion of said at least one video presentation, said at least one storage node comprising a first data buffer for buffering at least one of said N data blocks;

a plurality of communication nodes each having an input port that is coupled via a circuit switch to an output of said first data buffer for sequentially receiving a plurality of said N data blocks therefrom, said sequentially received N data blocks being associated with a same video presentation or with different video presentations, each of said plurality of communication nodes further having a plurality of output ports, individual ones of said plurality of output ports outputting a digital representation of one video presentation, individual ones of said plurality of communication nodes further comprising a second data buffer for buffering at least one of said N data blocks prior to outputting said at least one of said N data blocks; and at least one control node responsive to a first operating condition for causing transfer of one of said N data blocks from said first data buffer to an output port of a first communication node and also to an output port of a second communication node, said at least one control node being further responsive to a second operating condition for causing transfer of one of said N data blocks from said first data buffer to said second data buffer of one of said communication nodes, and for causing transfer of said one of said N data blocks from said second data buffer to a plurality of said output ports of said one of said communication nodes.

2. A media streamer as set forth in claim 1 and further including means for selectively retaining one of said N data blocks within said first data buffer if it is predicted that said one of said N data blocks will be output from at least one of said communications nodes within a predetermined period of time.

3. A media streamer as set forth in claim 1 and further including means for selectively retaining one of said N data blocks within said second data buffer if it is predicted that said one of said N data blocks will be output from at least one of said output ports of a communications node within a predetermined period of time.

4. A media streamer as set forth in claim 2 wherein, for one of said N data blocks that is not to be retained, said media streamer includes means for replacing said one of said N data blocks within said first data buffer, said replacing means being responsive to a predicted demand for the associated video presentation and also to a location, within a corresponding data representation of said one of said N data blocks, for determining a priority of retaining said one of said N data blocks with respect to others of said N data blocks stored within said first data buffer.

5. A media streamer as set forth in claim 4 wherein a higher priority is assigned to a data block that is located at or near a beginning of a data representation than is assigned to a data block that is located at or near an end of said data representation.

6. A media streamer as set forth in claim 3 wherein, for one of said N data blocks that is not to be retained, said media streamer includes means for replacing said one of said N data blocks within said second data buffer, said replacing means being responsive to a predicted demand for the associated video presentation and also to a location, within a corresponding data representation of said one of said N data blocks, for determining a priority of retaining said one of said N data blocks with respect to others of said N data blocks stored within said second data buffer.

7. A media streamer as set forth in claim 6 wherein a higher priority is assigned to a data block that is located at or near a beginning of a data representation than is assigned to a data block that is located at or near an end of said data representation.

8. A media streamer as set forth in claim 2 wherein, for one of said N data blocks that is to be retained, said media streamer includes means for replacing said one of said N data blocks within said first data buffer, said replacing means being responsive to a next predicted time that the said one of said N data blocks is required to be output from at least one of said communication nodes, and also to a number of output ports that are outputting a digital representation with which the said one of said N data blocks is associated.

9. A media streamer as set forth in claim 3 wherein, for one of said N data blocks that is to be retained, said media streamer includes means for replacing said one of said N data blocks within said second data buffer, said replacing means being responsive to a next predicted time that the said one of said N data blocks is required to be output from at least one of said output ports of an associated communication node, and also to a number of output ports that are outputting a digital representation with which the said one of said N data blocks is associated.

10. A media streamer as set forth in claim 1 wherein said at least one control node further includes means for synchronizing a first outputted data representation to a second outputted data representation such that said first data representation and said second data representation simultaneously output data from a same one of said N data blocks.

11. A media streamer as set forth in claim 1 wherein said first data buffer and said second data buffer are of approximately equal size.

12. A media streamer as set forth in claim 1 wherein said first data buffer and said second data buffer are components of a single data buffer that is distributed between said at least one storage node and said plurality of communication nodes.

* * * * *